United States Patent [19]
Yamanaka et al.

[11] Patent Number: 5,285,649
[45] Date of Patent: Feb. 15, 1994

[54] METHOD AND APPARATUS FOR CALCULATING TORQUE OF VARIABLE CAPACITY TYPE COMPRESSOR

[75] Inventors: Yasushi Yamanaka, Nakashima; Nobuharu Kakehashi, Anjo; Shigeo Numazawa, Nagoya; Yasuyuki Nishi; Hiroshi Kishita, both of Kariya; Kideki Suzuki, Chita, all of Japan

[73] Assignee: Nippondenso Co., Ltd., Kariya, Japan

[21] Appl. No.: 864,771

[22] Filed: Apr. 7, 1992

[30] Foreign Application Priority Data

| Oct. 9, 1991 | [JP] | Japan | 3-261936 |
| Oct. 9, 1991 | [JP] | Japan | 3-261949 |
| Oct. 9, 1991 | [JP] | Japan | 3-261955 |
| Oct. 9, 1991 | [JP] | Japan | 3-261956 |
| Oct. 9, 1991 | [JP] | Japan | 3-261958 |

[51] Int. Cl.$^5$ ............................................. F25B 27/00
[52] U.S. Cl. ................................. 62/133; 62/323.1; 123/339
[58] Field of Search ................ 62/133, 323.1, 323.4, 62/228.4, 208, 209, 243; 123/339

[56] References Cited

U.S. PATENT DOCUMENTS

| 4,488,411 | 12/1984 | Hara | 62/133 |
| 4,856,291 | 8/1989 | Takahashi | 62/217 |
| 4,898,005 | 2/1990 | Sakurai | 62/323.4 |
| 4,926,651 | 5/1990 | Noguchi | 62/133 |
| 5,018,362 | 5/1991 | Nagase et al. | 62/133 |

FOREIGN PATENT DOCUMENTS

| 59-92212 | 5/1984 | Japan . |
| 62-41951 | 2/1987 | Japan . |
| 1-244916 | 9/1989 | Japan . |

*Primary Examiner*—Harry B. Tanner
*Attorney, Agent, or Firm*—Cushman, Darby & Cushman

[57] ABSTRACT

In a method for calculating torque for a variable capacity type compressor provided in a refrigeration circuit and driven by an engine to compress and discharge refrigerant to be circulated through a heat exchanger in the refrigerant circuit, a rotational speed of the compressor is calculated, a quantity of refrigerant discharged from the compressor and pressure of refrigerant in high-pressure side are calculated, a capacity of the discharged refrigerant during operation of the compressor is calculated based on the calculated discharged refrigerant quantity and the calculated rotational speed, and the torque is calculated based on the calculated refrigerant pressure and the calculated capacity.

18 Claims, 17 Drawing Sheets

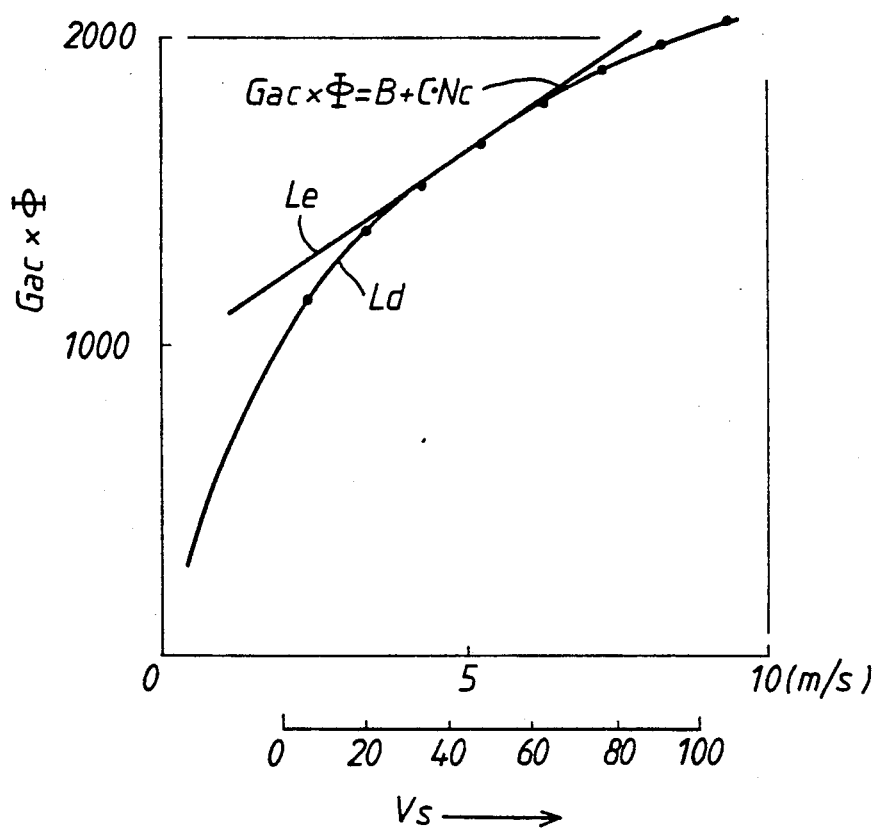

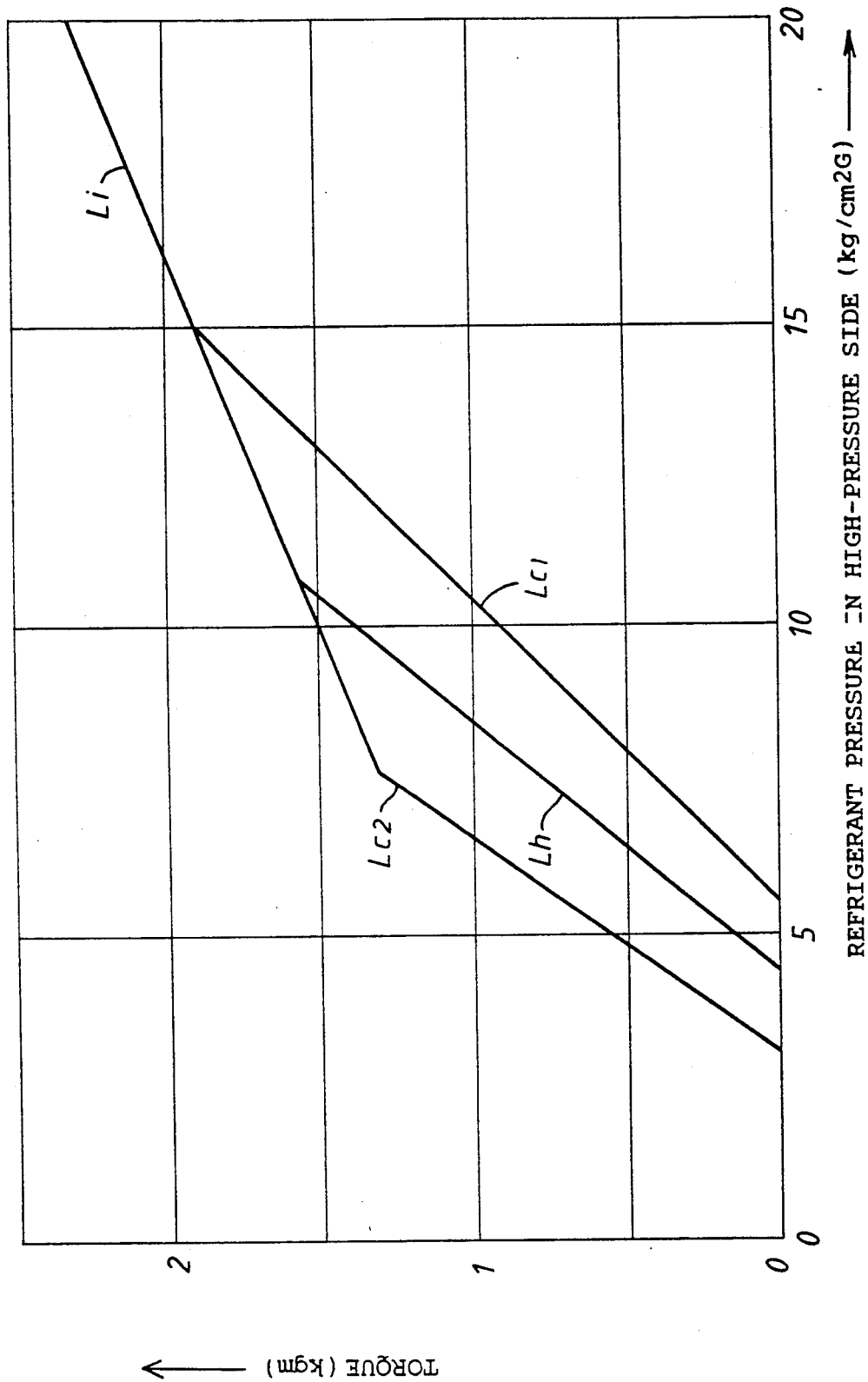

METHOD AND APPARATUS FOR CALCULATING TORQUE OF VARIABLE CAPACITY TYPE COMPRESSOR

BACKGROUND OF THE INVENTION

1. Field of the Invention

The present invention relates to a system provided with a refrigeration circuit for circulating refrigerant in accordance with operation of a variable capacity type compressor driven by a prime mover, and more particularly to a method and apparatus suitable for calculating drive torque for the variable capacity type compressor. The method and apparatus may be adapted for use in an idling rotational speed control device for stabilizing the idling rotational speed of an engine of torque for a variable capacity type compressor of an air conditioning system for a vehicle, or a device for controlling an amount of a current flowing into an electromagnetic clutch which couples the engine to the compressor in accordance with the torque of the compressor.

2. Description of Prior Art

In such an idling rotational speed control device as disclosed in, for example, the Japanese Publication No. 41951/1987, there is proposed the device which controls an idling rotational speed of an engine in accordance with pressure of refrigerant in a high-pressure side in a refrigerant circuit.

With such construction, while torque for a compressor varies almost in proportion to the pressure of refrigerant in the high-pressure side of the compressor, it also varies in accordance with a change in a capacity of the compressor in case the compressor is of a variable capacity type. Although the conventional structure is designed in the light of pressure of refrigerant in the high-pressure side of the compressor, no consideration is given on a possible change in torque caused by a change in the capacity of the compressor. Therefore, torque for the compressor may not be accurately utilized for control of an idling rotational speed of an engine, thus lowering accuracy of the idling rotational speed. As a result, fuel consumption becomes worse when the idling rotational speed is maintained high, while engine stalling or undesired vibration would occur when the idling rotational speed is maintained low. In this respect, it is desired to calculate driving torque for the variable capacity type compressor taking account of a change in torque for the compressor caused by the change in the capacity of the compressor as well as the change in pressure of refrigerant in the high-pressure side of the compressor.

SUMMARY OF THE INVENTION

It is therefore a primary object of the present invention to provide a method and apparatus suitable for calculating torque for a variable capacity type compressor, capable of aquiring torque for the compressor by means of calculation, taking account of a change in a capacity of the compressor without use of an expensive torque meter.

It is a second object of the present invention to provide a method and apparatus suitable for calculating torque for a variable capacity type compressor, capable of acquiring a capacity of the compressor in accordance with a quantity of refrigerant and a rotational speed for acquiring torque corresponding to the acquired capacity.

It is a third object of the present invention to provide a method and apparatus suitable for calculating torque for a variable capacity type compressor, capable of acquiring a refrigerant flow quantity without a special flow quantity meter for calculating torque based on the acquired refrigerant flow quantity.

It is a fourth object of the present invention suitable for calculating torque for a variable capacity type compressor, capable of simply calculating torque corresponding to a capacity of the compressor.

It is a fifth object of the present invention to provide a method and apparatus suitable for calculating torque for a variable capacity type compressor, capable of controlling an idling rotational speed of an engine corresponding to a change in torque for the compressor with relative accuracy.

It is a sixth object of the present invention to provide a method and apparatus suitable for calculating torque for a variable capacity type compressor necessary for controlling an idling rotational speed of an engine in good stable manner when operation of the engine is changed from the non-idling operation to the idling operation.

It is a seventh object of the present invention to provide a method and apparatus suitable for calculating torque for a variable capacity type compressor of an air conditioner, having an ambient temperature sensor and a refrigerant temperature sensor for measuring a temperature of condensed refrigerant, in accordance with a change in a capacity of the compressor.

It is an eighth object of the present invention to provide a method and apparatus for calculating torque for a variable capacity type compressor necessary for controlling an idling rotational speed of an engine for driving an air conditioner.

It is a ninth object of the present invention to provide a method and apparatus for calculating torque for a variable capacity type compressor of a refrigeration circuit provided in a system and driven by an engine to circulate refrigerant, capable of accurately calculating torque for the compressor acting as load of a driving source, regardless of disturbance in consideration of not only pressure of refrigerant in the high-pressure side of the compressor but also a capacity of the compressor.

It is a tenth object of the present invention to provide a method and apparatus suitable for calculating torque for a variable capacity type compressor of a refrigeration circuit, capable of accurately calculating the torque with a simple structure. More specifically, the method and apparatus is designed to acquire torque changing smoothly and continuously in accordance with heat load acting on the refrigeration circuit in a continuous and smooth changing manner.

It is an eleventh object of the present invention to provide a method and apparatus for calculating torque for a variable capacity type compressor provided in a refrigeration circuit of a system and driven by an engine to circulate refrigerant through a heat exchanger, which is capable of accurately calculating torque for the compressor acting as load of the engine, with delay of a change in air load conditions of the heat exchanger given by a delay time of a change in a heat capacity of the heat exchanger, taking account of changes in the compressor capacity as well as pressure of refrigerant in the high-pressure side of the compressor.

It is a twelfth object of the present invention to provide a method and apparatus for calculating torque for a variable capacity type compressor provided in a refrigeration circuit of a system and driven by an engine to circulate refrigerant through a heat exchanger, which is capable of calculating torque for the compressor acting as load of a driving source, taking account of a change not only in pressure of refrigerant in the high-pressure side of the compressor but also in a capacity of the compressor, and is also capable of restricting the calculated torque in an actually expected proper range, regardless of influences of disturbance or the like. range in accordance with the determined pumping pressure.

To achieve the primary object of the present invention, there is provided a method for calculating torque for a variable capacity type compressor provided in a refrigeration circuit and driven by a prime mover to compress and discharge refrigerant to be circulated through a heat exchanger in the refrigeration circuit, the method comprising the steps of:

calculating a rotational speed of the compressor;

calculating a quantity of the refrigerant discharged from the compressor and pressure of the refrigerant circulated in a high-pressure side of the refrigeration circuit;

calculating a capacity of the compressor, which is operating, based on the calculated quantity of the refrigerant and the calculated rotational speed; and calculating the torque in accordance with the calculated pressure of the refrigerant and the calculated capacity.

According to an aspect of the present invention, there is provided a method for calculating torque, wherein the refrigerant circuit is a refrigeration circuit for an air conditioner; and wherein the step of calculating a capacity of the compressor is a step of calculating a capacity of the compressor based on a ratio of the calculated quantity of the refrigerant to the calculated rotational speed.

To achieve another object of the present invention, there is provided a method for calculating torque for a variable capacity type compressor provided in a refrigeration circuit of an air conditioner and driven by a prime mover to compress and discharge refrigerant to be circulated through a condenser and an evaporator in the refrigeration circuit, the method comprising steps of:

calculating a rotational speed of the compressor;

calculating a quantity of the refrigerant discharged from the compressor;

calculating a capacity of the compressor based on said calculated rotational speed and the calculated quantity of the refrigerant;

calculating pressure of refrigerant circulated in a high-pressure side of the refrigeration circuit; and calculating the torque in accordance with the calculated pressure of the refrigerant and the calculated capacity.

According to an aspect of present invention, there is provided a method for calculating torque, wherein the step of calculating the quantity of the refrigerant is to calculate the quantity of the refrigerant in accordance with the calculated rotational speed, an ambient temperature corresponding to a temperature of air flowing into the air conditioner from an outside thereof, and a temperature of condensed refrigerant corresponding to a temperature of the refrigerant in the condenser.

According to another aspect of the present invention, there is provided a method for calculating torque, wherein the prime mover is an engine for driving an automotive vehicle installed with the air conditioner and having a control valve for controlling an idling operation of the engine;

further comprising a step of using the calculated torque for controlling an opening degree of the control valve.

According to further aspect of the present invention, there is provided a method for calculating torque, wherein the engine comprises an idling control device provided for determining the opening degree of the control valve and controlling the control valve, the idling control device comprising means for determining whether or not the engine is maintained in idling condition thereof;

wherein the step of calculating the torque is to calculate the torque during non-idling operation of the engine; and wherein the step of using the calculated torque is to control the opening degree of the control valve based on the calculated torque during non-idling operation of the engine and to control the opening degree of the control valve in accordance with a difference between the calculated rotational speed and a predetermined idling speed of the engine after the engine is actually conditioned in the idling operation.

According to a still further aspect of the present invention, there is provided a method for calculating torque, wherein the step of calculating the quantity of the refrigerant is to calculate based on a speed of the vehicle, an ambient temperature corresponding to a temperature of air flowing into the air conditioner from an outside thereof, and a temperature of condensed refrigerant corresponding to a temperature of the refrigerant in the condenser.

According to a further object of the present invention, an apparatus for calculating torque for a variable capacity type compressor provided in a refrigeration circuit driven by an engine of an automotive vehicle to compress and discharge refrigerant to be circulated through a heat exchanger in the refrigeration circuit, the vehicle having an idling detecting means for detecting an idling operation of the engine, and an idling rotational speed control device for controlling an idling rotational speed of the engine in response to a detected result of the idling detecting means, the apparatus comprising:

means for determining pressure of the refrigerant discharged from the compressor;

means for determining heat-exchanging ability of the heat exchanger; and means for calculating the torque for the compressor necessary for controlling the idling rotational speed of the engine in accordance with the determined discharged pressure and the determined heat-exchanging ability.

According to a still further object of the present invention, an apparatus for calculating torque for a variable capacity type compressor provided in a refrigeration circuit equipped with an automotive vehicle to compress and discharge refrigerant to be circulated through a condenser and an evaporator in the refrigeration circuit, the apparatus comprising:

ambient temperature detecting means for detecting a temperature of air coming an inside of the vehicle from an outside so as to radiate heat from the condenser;

refrigerant temperature detecting means for detecting a temperature of condensed refrigerant in the condenser;

vehicle speed detecting means for detecting a speed of the vehicle;

rotational speed detecting means for detecting a rotational speed of the compressor; and torque calculation means for calculating torque for the compressor in accordance with the detected ambient temperature of the air, the detected temperature of the condensed refrigerant, the detected speed of the vehicle and the detected rotational speed.

According to a still object of the present invention, there is provided an apparatus for calculating torque for a variable capacity type compressor provided in a refrigeration circuit and driven by a prime mover for compressing and discharging refrigerant to be circulated through a condenser and a heat exchanger in the refrigeration circuit, the apparatus comprising:

temperature detecting means arranged at a position unaffectable by a temperature of a circulating air flow coming toward an inlet of the condenser from the prime mover and for detecting an ambient temperature of air outside the vehicle;

pressure determining means for determining pressure of the refrigerant discharged from the compressor;

temperature compensation means for compensating said detected ambient temperature of the air so as to reduce influence of the temperature of the circulating air flow in accordance with a time elapsing after start of the vehicle and for compensating the detected ambient temperature of the air so as to increase influence of the temperature of the circulating air flow in accordance with a time elapsing after stop of the vehicle;

heat-exchanging ability determining means for determining heat-exchanging ability of the heat exchanger in accordance with the compensated result of the temperature compensation means; and torque calculation means for calculating the torque for the compressor in accordance with the determined discharged pressure and the determined heat-exchanging ability.

According to a still further object of the present invention, there is provided an apparatus for calculating torque for a variable capacity type compressor provided in a refrigeration circuit to circulate refrigerant through a condenser and an evaporator, the apparatus comprising:

capacity detecting means for detecting a capacity of the compressor;

pressure detecting means for detecting pressure of the refrigerant in the high-pressure side of the refrigeration circuit in accordance with pressure of condensed refrigerant in the condenser;

first torque calculation means for calculating the first torque for the compressor based on a first equation using the detected capacity and the detected refrigerant pressure;

second torque calculation means for calculating the second torque for the compressor based on a second equation using a predetermined capacity representing a maximum capacity of the compressor and the detected pressure of the refrigerant; and torque selection means for selecting a smaller one of the first and second torque calculated by the first and second torque calculation means as the torque for the compressor.

According to a still further object of the present invention, there is provided an apparatus for calculating torque for a variable capacity type compressor provided in a refrigeration circuit and driven by a prime mover of an automotive vehicle and circulating refrigerant through a heat exchanger in the refrigeration circuit, the apparatus comprising:

pressure determining means for determining pressure of the refrigerant discharged from the compressor;

delaying means for delaying a change in the detected air load condition by a transient delay time of a change in heat-exchanging ability caused by a heating capacity of the heat exchanger when the actual air load condition of the heat exchanger varies;

heat-exchanging ability determining means for determining heat-exchanging ability of the heat exchanger in accordance with the delayed air load condition upon elapse of the delay time; and torque calculation means for calculating torque for the compressor in accordance with the determined discharged pressure and the determined heat-exchanging ability.

According to a still further object of the present invention, there is provided an apparatus for calculating torque for a variable capacity type compressor in a refrigeration circuit provided in a system and driven by a driving source of an automotive vehicle for circulating refrigerant through a heat exchanger in the refrigeration circuit, the apparatus comprising:

pressure determining means for determining pressure of the refrigerant discharged from the compressor;

heat-exchanging ability determining means for determining heat-exchanging ability of the heat exchanger;

torque calculation means for calculating torque for the compressor in accordance with the determined discharged pressure and the determined heat-exchanging ability; and torque correction means for correcting the calculated torque in accordance with the determined pressure of the pressure determining means so as to restrict the calculated torque within a predetermined allowable torque range.

BRIEF DESCRIPTION OF THE DRAWINGS

FIG. 8 is a graph showing the relationship between $Gac \times \Phi$ and a speed $Vs$ of an automotive vehicle;

FIG. 20 is a graph showing the relationship among torque Ta, Tb, T1 and T2 defining a torque allowable range in association with pressure Ph of refrigerant in the high-pressure side in the sixth preferred embodiment.

DETAILED DESCRIPTION OF THE PREFERRED EMBODIMENTS

The outline of preferred embodiments according to the present invention will now be described before they are explained separately. A quantity Gr of refrigerant flowing through a refrigeration circuit may be measured by a sensor, but may be calculated from a rotational speed Nc of a compressor, a temperature Trc of condensed refrigerant and an ambient temperature Tac of the outside. When the refrigerant flow quantity Gr is acquired, a pump-out volume Vc will be found based on Gr and Nc. As it is known that torque T of the compressor varies with a change of the pump-out volume Vc, the torque T can be acquired as a function of the pump-out volume Vc in such a way to change the torque T in accordance with the pump-out volume Vc. In one embodiment, therefore, the torque T is calculated with T=Ta considered proportional to Vc if the acquired Vc (Vc<Vcm) is relatively small and with T=Tb considered proportional to Vcm if the acquired Vc (Vc<Vcm) is relatively large.

Torque T is repetitively obtained at every cycle of a computer program, yielding a difference between a current value Tn and an immediately preceding value Tn−1, i.e., a change of the torque T, to reflect it on a control output Vn. A difference in a rotational speed of the compressor is acquired as a difference between a rotational speed Nc measured in a predetermined program cycle and a desired rotational speed Nco, i.e., En=Eco−Nc. The difference En is repetitively calculated at every program cycle, yielding a difference between the current value En and an immediately preceding value En−1, i.e., a change of the difference En. The change of En is reflected on the control output Vn as the same as the change of the torque. A flow quantity Gr. of refrigerant may be computed or calculated in accordance with the rotational speed Nc of the compressor, a suction temperature Tae of an evaporator and a temperature Tre of refrigerant in the evaporator. The evaporator suction temperature Tae and refrigerant temperature Tre may be also measured respectively by an ambient temperature sensor (90) and a refrigerant temperature sensor (100) both of which will be discussed in a later description of one embodiment. While another embodiment requires the pumping pressure of compressed refrigerant (refrigerant pressure Ph in the high-pressure side) and suction pressure Ps of refrigerant in the compressor to calculate torque T (Ta or Tb), the suction pressure Ph may be acquired through the actual measure using a pressure sensor, instead of being calculated as a function of the condensed refrigerant temperature Trc.

Figure 1:
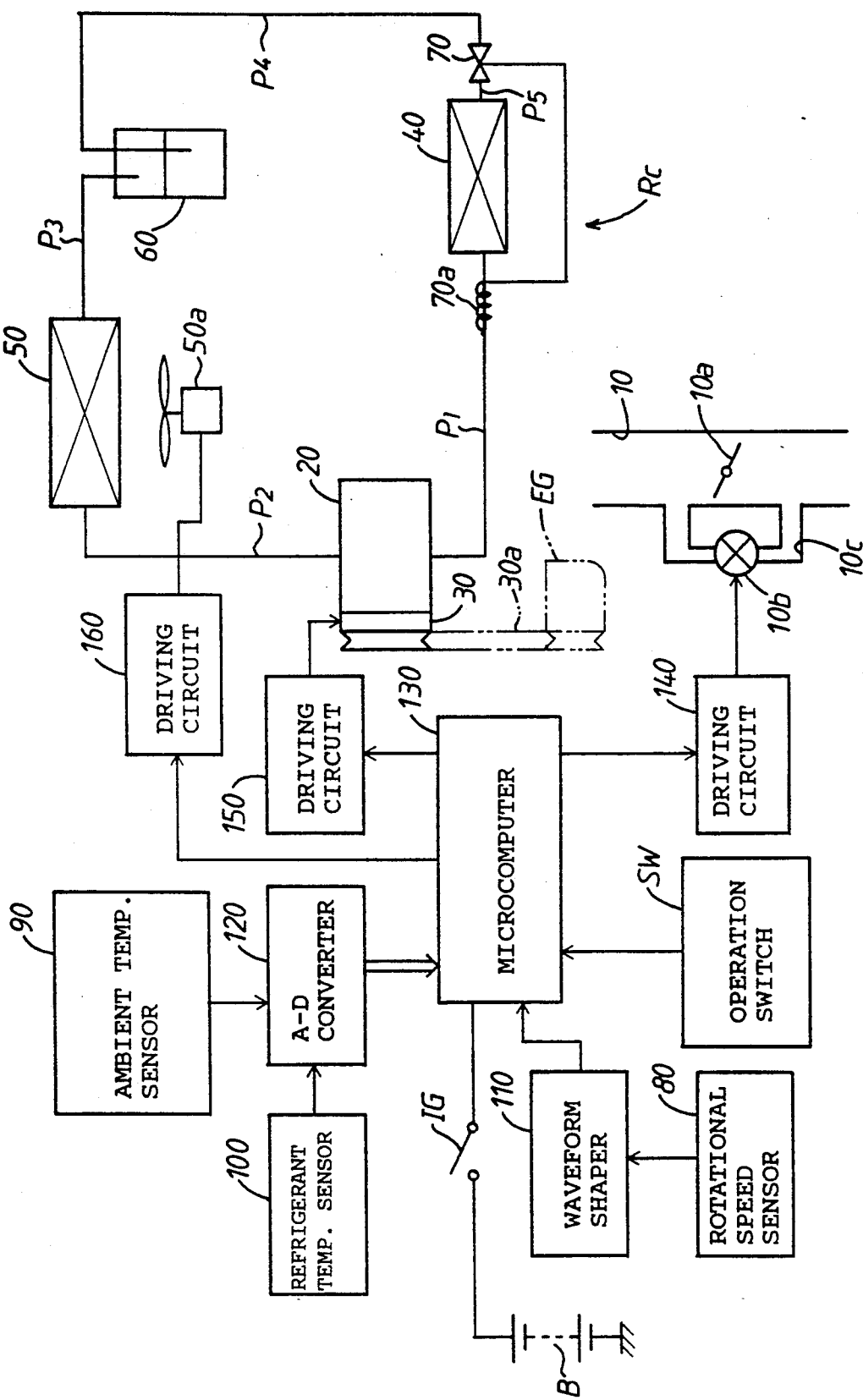
FIG. 1 is a block diagram illustrating a first preferred embodiment in accordance with the present invention.

A first preferred embodiment according to the present invention will now be described referring to the accompanying drawings. In FIG. 1, the reference numeral 10 indicates a suction passage 10 of an engine (hereinafter called as "engine EG") for an automotive vehicle. Within the suction passage 10 is disposed a throttle valve 10a which adjusts a quantity of air sucked into the suction passage 10 in accordance with an opening degree thereof caused by a depression degree of an accelerator pedal by a vehicle driver. Then, an air-fuel mixture is formed on a basis of the quantity of air sucked into the suction passage 10 and the resulting amount of fuel injection, and in turn is supplied to a combustion chamber of the engine Eg to be burnt. An idling regulator valve 10b is provided in a bypass passage 10c of the suction passage 10 to control an amount of sucked air bypassing from the upstream of the throttle valve 10a to the downstream according to an opening degree of the idling regulator valve 10b.

A refrigeration circuit or refrigeration cycle Rc constitutes a part of an air conditioner for the vehicle and includes a variable capacity type compressor 20. When an electromagnetic clutch 30 is selectively engaged to connect the compressor 20 to the engine EG, the compressor 20 receives output power from the engine Eg through a belt mechanism 30a to be driven. The compressor 20 compresses refrigerant through a pipe P1 from an evaporator 40 to discharge compressed refrigerant into a pipe P2 at a high temperature and high pressure. A condenser 50 condenses the compressed refrigerant from the pipe P2 under air cooling effect of a cooling fan 50a, and supplies the condensed refrigerant into a pipe P3. A receiver 60 separates the condensed refrigerant from the pipe P3 into a gas phase component and a liquid phase component which is applied as refrigerant to a pipe P4. A thermo-sensing element 70a adjusts an opening degree of an expansion valve 70 in accordance with a temperature of the refrigerant in the pipe P1. The refrigerant from the pipe P4 is expanded in accordance with the opening degree of the expansion valve 70 and is then supplied through a pipe P5 into the evaporator 40. The evaporator 40 cools an air flow thereinto in accordance with the expanded refrigerant from the pipe P5. The refrigerant from the evaporator 40 is circulated through the pipe P1 into the compressor 20. In addition, the condenser 50 is arranged in the engine room.

The arrangement of an electric circuit for the idling regulator valve 10b and electromagnetic clutch 30 will now be explained. When the air conditioner is activated, a manual switch SW is actuated to produce an actuation signal therefrom. A rotational speed sensor 80 detects a rotational speed Nc of the compressor 20 to generate a rotational speed pulse having a frequency proportional to the detected result. An ambient temperature sensor 90 is arranged between the condenser 50 and a front grille of the vehicle and detects a temperature of air outside the vehicle to generate an ambient temperature detection signal. A refrigerant temperature sensor 100 is attached to a surface of the condenser 50 and detects the surface temperature of the condenser 50 to generate a refrigerant temperature detection signal indicating a condensed refrigerant temperature in the condenser 50.

Figure 2:
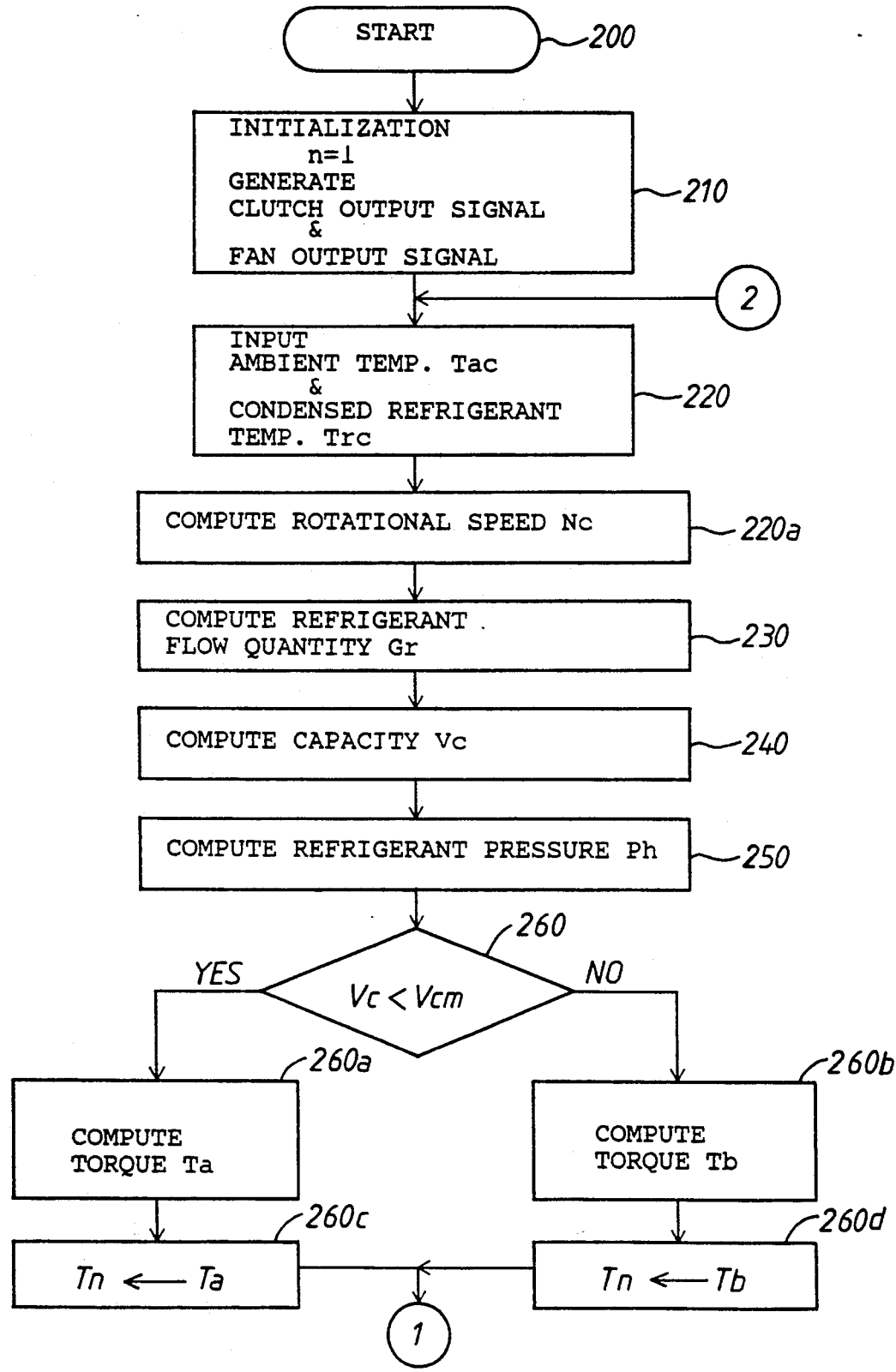
FIGS. 2 and 3 illustrate a flow chart indicative of operation of the microcomputer in FIG. 1.

A wave shaper 110 shapes a rotational speed pulse from the rotational speed sensor 80 sequentially to generate a shaped rotational speed pulse. An A-D converter 120 converts the ambient and refrigerant temperature detection signals from the ambient and refrigerant temperature sensors 90 and 100 respectively into a digital ambient temperature signal and a digital refrigerant temperature signal. A microcomputer 130 executes a computer program in accordance with a flow chart shown in FIGS. 2 and 3. During the execution of the program, the microcomputer 130 performs arithmetic operations necessary to control driving circuits 140, 150 and 160 respectively connected to the idling regulator valve 10b, the electromagnetic clutch 30 and the cooling fan 50a. The above computer program is previously stored in a ROM of the microcomputer 130. The microcomputer 130 is activated with power supplied from a battery B when an ignition switch IG of the vehicle is closed. In response to the actuation signal from the manual switch SW, the microcomputer 130 starts executing the computer program.

In operation, the ignition switch IG is closed to start the engine EG and also to activate the microcomputer 130. When the operation switch SW produces an operation signal at this stage, the microcomputer 130 starts running the computer program according to the flow chart of FIG. 2 in step 200, and sets a variable n to "1" at the initialization and generates in step 210 a clutch output signal necessary for engaging the clutch 30 and a fan output signal necessary for driving the cooling fan 50a. Consequently, the electromagnetic clutch 30 is engaged by the driving circuit 150 in response to the clutch output signal from the microcomputer 130, and the compressor 20 is driven with output power supplied through the belt mechanism 30a and electromagnetic clutch 30 from the engine EG. The cooling fan 50a is driven by the driving circuit 160 in response to the fan output signal from the microcomputer 130. In the meantime, in the refrigeration circuit Rc, the compressor 20 sucks into and compresses refrigerant in the pipe P1 and discharges it as high-temperature and high-pressure compressed refrigerant into the pipe P2. The condenser 50 condenses the compressed refrigerant from the pipe P2 under cooling effect of the cooling fan 50a and applies it as condensed refrigerant into the pipe P3. The receiver 60 applies a liquid phase component of the condensed refrigerant from the pipe P3 as refrigerant into the pipe P4, the expansion valve 70 expands the refrigerant from the pipe P4 in accordance with a temperature of refrigerant in the pipe P1 to supply it into the evaporator 40. Then, the evaporator 40 cools an air flow thereinto in accordance with the supplied refrigerant.

After the execution in step 210, the microcomputer 130 receives in step 220 a value of a digital ambient temperature signal (hereinafter called as "an ambient temperature Tac") and a value of a digital refrigerant temperature signal (hereinafter called as "a condensed refrigerant temperature Trc") from the A-D converter 120. Then, the microcomputer 130 calculates a rotational speed Nc of the compressor 20 in step 220a in accordance with each shaped rotational speed pulse from the waveform shaper 110.

In the subsequent step 230, the microcomputer 130 computes or calculates a quantity Gr (kg/hour) of refrigerant flowing through the refrigeration circuit Rc on a basis of the following equation (1) in accordance with the ambient temperature Tac and condensed refrigerant temperature Trc acquired in step 220 and the rotational speed Nc acquired in step 220a. The reason for acquiring Gr will be discussed later using equations (7) to (13).

$$Gr = A(B + C \times Nc)(Trc - Tac)/(D - E \times Trc) \tag{1}$$

wherein A to E are constants, and $A = 0.24$, $B = 950$, $C = 0.35$, $D = 38$ and $E = 0.18$, respectively. It is apparent from the equation (1) that the refrigerant flow quantity Gr expresses a function of $(Trc - Tac)$.

In the next step 240, the microcomputer 130 computes a pump-out volume Vc(cc) of refrigerant in the compressor 20 on a basis of the following equation (2) in accordance with the computed refrigerant flow quantity Gr and the rotational speed Nc acquired in step 220a.

$$Vc = Gr/Nc \times F \tag{2}$$

wherein $F = 9.2 \times 10^{-4}$.

In the next step 250, the microcomputer 130 computes high-pressure side refrigerant pressure Ph based on the following equation (3) in accordance with the condensed refrigerant temperature Trc acquired in step 220.

$$Ph = f(Trc) \tag{3}$$

The equation (3) represents that Ph, i.e. f(Trc) is a function of Trc.

When the computed pump-out volume Vc is smaller than the maximum pump-out volume Vcm of the compressor 20 (i.e., $Vc < Vcm$), the microcomputer 130 determines "YES" in step 260 and computes torque Ta of the compressor 20 in step 260a on a basis of the following equation (4) in accordance with the high-pressure side refrigerant pressure Ph acquired in step 250.

$$Ta = K \times Ps \times \{(Ph/Ps)^m - 1\} \times Vc \tag{4}$$

The meanings of Ps, etc. will be explained later.

If $Vc \geq Vcm$, the microcomputer 130 determines "NO" in step 260 and computes torque Tb of the compressor 20 in step 260b based on the following equation (5) in accordance with the high-pressure side refrigerant pressure Ph acquired in step 250.

$$Tb = K \times Ps \times \{(Ph/Ps)^m - 1\} \times Vcm \tag{5}$$

In the equations (4) and (5), K and m are constants of $2 \times 10^{-2}$ and 0.123, respectively. Ph represents the pumping pressure (kg/cm² absolute pressure) of the compressed refrigerant of the compressor 20, while Ps represents suction pressure of the refrigerant of the compressor 20 and $Ps = 3$ (kg/cm² absolute pressure).

The reasons for employing and deriving the above equations (1) to (5) will be explained below. In general, torque of the compressor 20, when denoted as T, is expressed by the following equation (6).

$$T = K \times Ps \times \{(Ph/Ps)^m - 1\} \times Vc \qquad (6)$$

The equation (6) is identical to the equation (4) with Ta set equal to T.

Since the terms on the right-hand side of the equation (6) except Ph and Vc take known values as mentioned above, the torque T may be determined once Ph and Vc are determined. The pump-out volume Vc satisfies the equation (2) in association with a refrigerant flow quantity Gr of the refrigeration cycle Rc as mentioned earlier. If a rotational speed Nc of the compressor 20 and refrigerant flow quantity Gr are determined, therefore, the pump-out volume Vc may be determined. In this respect, it is important whether the refrigerant flow quantity Gr or the equation (1) may be determined or not.

The present inventors tried to determine the refrigerant flow quantity Gr based on a temperature difference between an ambient temperature Tac and a condensed refrigerant temperature Trc, taking account of generally known physical phenomena that when a difference between a surface temperature of the condenser 50 (i.e., an ambient temperature Tac on the surface) and a condensed refrigerant temperature Trc in the condenser 50 is large (i.e., when Trc is significantly higher than Tac), heat radiation ability of the condenser 50 is large to maintain the refrigerant flow quantity large, while when the difference between Trc and Tac is small the refrigerant flow quantity Gr is little.

The condenser 50 generally cools and condenses high-temperature and high-pressure compressed refrigerant from the compressor 20 and discharges it as condensed refrigerant having two phases of gas phase and liquid phase. It is known that a quantity Qrc of heat radiated by the condenser 50 in association with a refrigerant in the condenser 50 is associated with a refrigerant enthalpy difference $\Delta i$ (kcal/kg) between an inlet and an outlet of the condenser 50 and further satisfies the following equation (7).

$$Qrc = \Delta i \times Gr \qquad (7)$$

Figure 4:
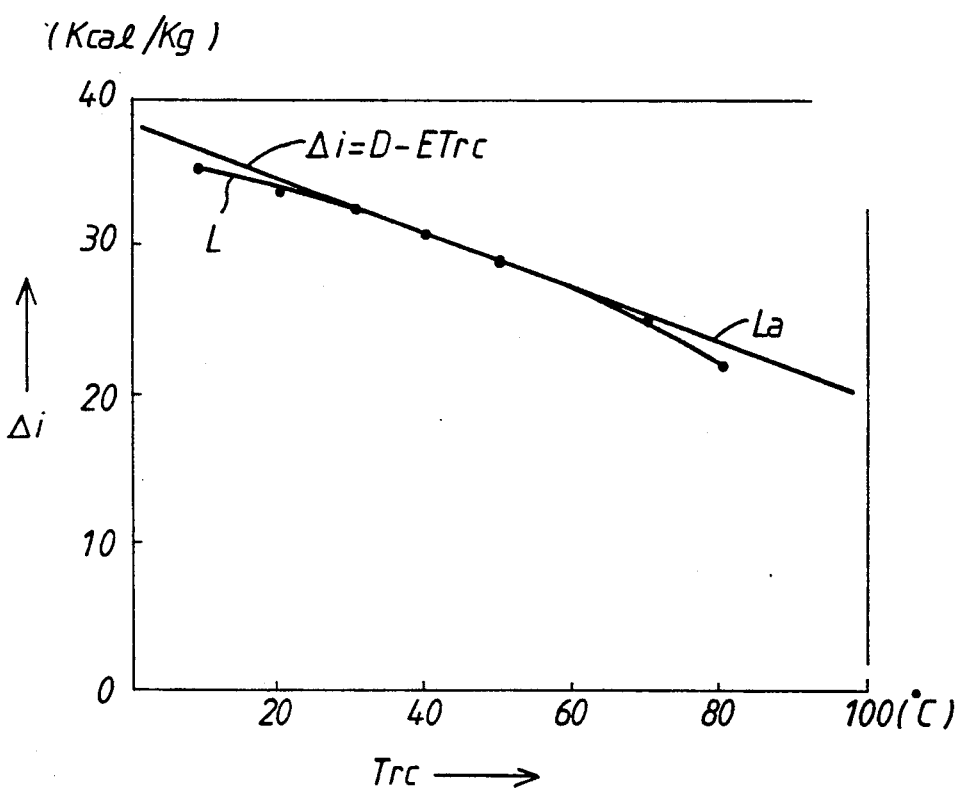
FIG. 4 is a graph showing the relationship between a latent heat $\Delta i$ and a temperature $Trc$ of condensed refrigerant.

In such a case, $\Delta i$ essentially corresponds to latent heat of the condensed refrigerant and is specified by a curve L in association with a condensed refrigerant temperature Trc as shown in FIG. 4 when the refrigerant is R12, for example. Approximation of the curve L by a straight line La yields the following equation (8).

$$\Delta i = D - E \times Trc \qquad (8)$$

The right-hand side of the equation (8) is the same as the denominator of the right-hand side of the equation (1). Thus, the equation (7) can be rewritten as follows.

$$Qrc = (D - E \times Trc) \times Gr \qquad (9)$$

Figure 5:
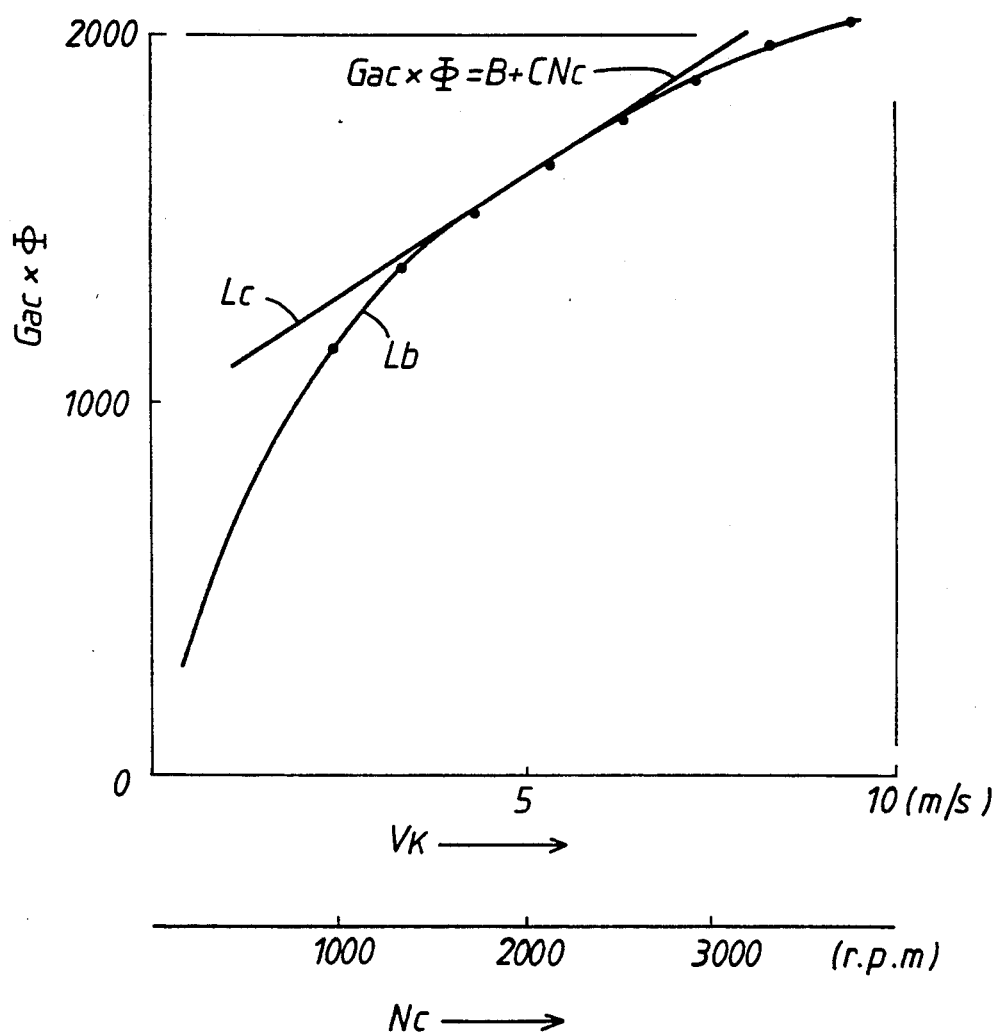
FIG. 5 is a graph showing the relationship between $Gac \times \Phi$ and a velocity $Vk$ of an air flow from the outside and a rotational speed $Nc$.

The quantity Qrc of heat radiated by the condenser 50 has been considered above with respect to refrigerant within the condenser 50. A quantity Qac of air-side heat radiated by the condenser 50 will now be considered in association with an ambient temperature Tac on the surface of the condenser 50. This quantity Qac of radiated heat is specified by the following equation (10).

$$Qac = Gac \times \Phi \times A \times (Trc - Tac) \qquad (10)$$

wherein Gac is a quantity (kg/hour) of air flowing into the condenser 50 from the outside, $\Phi$ is thermal efficiency, and A=0.24. In consideration that a velocity of the outside air flow corresponds to a vehicle speed which nearly corresponds to a rotational speed of the engine EG and that the engine rotational speed corresponds to a rotational speed Nc (r.p.m.) of the compressor 20, $Gac \times \Phi$ is specified by a curve Lb in association with a velocity Vk (m/s) of the outside air flow on the surface (i.e., at the front side) of the condenser 50 or the rotational speed Nc (r.p.m.) of the compressor 20 as shown in FIG. 5. Approximation of the curve Lb by a straight line Lc therefore yields the following equation (11).

$$Gac \times \Phi = B + C \times Nc \qquad (11)$$

wherein B=950 and C=0.35. Substitution of the equation (11) into the equation (10) thus yields the following equation (12).

$$Qac = (B + C \times Nc) \times A \times (Trc - Tac) \qquad (12)$$

When the engine EG is idling, $Gac \times \Phi$ may be considered as constant, because the quantity of air flowing into the condenser 50 is only the quantity of air coming from the cooling fan 50a.

As the quantity Qrc of radiated heat from the condensed refrigerant in the condenser 50 is finally radiated to the air side, Qrc=Qac is satisfied. The following equation (13) will therefore be derived from both the equations (9) and (12).

$$Gr = A(B + C \times Nc)(Trc - Tac)/(D - E \times Trc) \qquad (13)$$

When the refrigerant flow quantity Gr is obtained, Vc may be specified as expressed by the equation (2), so that the torque T may be determined from the equation (6). The equation (4) will be yielded by setting T=Ta in the equation (6), while the equation (5) will be yielded by setting T=Tb and Vc=Vcm in the equation (6). The individual equations (1) to (5) and the maximum pump-out volume Vcm are previously stored in the ROM of the microcomputer 130.

When the arithmetic operation in step 260a or 260b is completed as described above, the microcomputer 130 sets the torque Ta to Tn in step 260c after the step 260a and sets the torque Tb to Tn in step 260d after the step 260b. When the rotational speed of the engine EG is maintained a value between 600 (r.p.m.) and 700 (r.p.m.), the microcomputer 130 considers that the engine EG is idling and determines "YES" in step 270 in association with the rotational speed Nc known in step 220a. The microcomputer 130 then subtracts the rotational speed Nc in step 220a from the desired rotational speed Nco of the compressor 20 and sets the subtraction result (Nco−Nc) into a deviation En in association with n=1 in step 270a. In this case, this initial deviation will be called as a deviation E1 hereafter. The desired rotational speed Nco is previously stored in the ROM of the microcomputer 130. In the subsequent step 280, the microcomputer 130 determines as to n=1. As the decision at this stage is "YES," the microcomputer 130 sets En−1=E0=0 and En=E1=0 and sets a driving voltage Vn−1=V0 representing a desired opening degree of the idling regulator valve 10b (see FIG. 1) to an initial driving voltage V00 in step 280a. The process in step 280a is initialization to properly perform execution in step 280b first time.

In step 280b, the microcomputer 130 computes a driving voltage Vn based on the following equation (14) in accordance with the deviation E1 in step 270a and the deviation E0=0 and the driving voltage V0 in step 208a. As n=1 at this time, V1 is obtained actually.

$$Vn = Vn-1 + Kp(En - En-1) - (\theta/Ti) \times En \quad (14)$$

wherein Kp, $\theta$ and Ti each represent a control constant. This equation (14) is also previously stored in the ROM of the microcomputer 130.

When the arithmetic operation in step 280b is completed, the microcomputer 130 generates the driving voltage V1 in step 280b as an opening degree output signal in step 290. In response to this signal, the driving circuit 140 (see FIG. 1) opens the idling regulator valve 10b by a desired opening degree corresponding to the driving voltage V1. Consequently, an amount of by-passing air flowing through bypass passage 10c from the upstream of the throttle valve 10a to the downstream is adjusted by the desired opening degree of the idling regulator valve 10b, thereby keeping the engine EG idling. The microcomputer 130 updates n as n=n+1=2 in step 290a. While the decision in step 270 is "YES," the microcomputer 130 repeats the above-described operation, incrementing n for its renewal every one cycle.

With the decision in step 270 being repeatedly made "YES," when the driver depresses the accelerator pedal to start the vehicle, the microcomputer 130 determines "NO," meaning that the engine EG is not idling, in step 270 based on the latest rotational speed Nc acquired in step 220a and advances the computer program to step 270b. Then, the microcomputer 130 sets a difference (Tn−Tn−1) between the latest torque Tn and preceding torque Tn−1 into a torque difference $\Delta T$ in step 270b. In the next step 270c, the microcomputer 130 computes a driving voltage Vn based on the following equation (15) in accordance with the driving voltage Vn−1 computed one cycle before and the torque difference $\Delta T$ acquired in step 270b.

$$Vn = Vn-1 + a \times \Delta T \quad (15)$$

wherein a represents a constant. This equation (15) is also previously stored in the ROM of the microcomputer 130.

Then, the microcomputer 130 generates in step 290 the driving voltage Vn obtained in step 270b as an opening degree output signal. In response to this signal, the driving circuit 140 opens the idle regulating valve 10b by a desired opening degree corresponding to the driving voltage Vn. Consequently, an amount of bypassing air flowing through the bypass passage 10c from the upstream of the throttle valve 10a to the downstream is adjusted by the desired opening degree of the idling regulator valve 10b. At this time, a quantity of air flowing through the throttle valve 10a in the suction pipe 10 is adjusted in accordance with the opening degree of the throttle valve 10b. After execution of the arithmetic operation in step 290, the microcomputer 130 updates n as n=n+1 in step 290a, then returning the computer program to step 220.

In the state where the decision in step 270 of the computer program is repeatedly "NO" during running of the vehicle as described above, the program sequentially advances to steps 270b, 270c, 290, 290a, 220, 220a and so forth to perform the associated arithmetic operations. In this arithmetic operations, torque Ta (or torque Tb) is repeatedly computed in accordance with the input values in step 220 and the results of the arithmetic operations in the individual steps 220a to 250. Then, the microcomputer 130 repeatedly computes a difference between the previous value of the computed torque Ta (or Tb) and the latest value thereof as a torque difference $\Delta T$ in step 270b, repeatedly computes a driving voltage Vn based on the equation (15) in accordance with the driving voltage Vn−1 and the torque difference $\Delta T$ in step 270c, and repeatedly generates this driving voltage Vn as an opening degree output signal in step 290. In this case, when Vc<Vcm is satisfied, the torque Ta is determined using the equation (4) in step 260a in such a way that Ta varies in proportion to a change in Vc.

When the vehicle is stopped to make the engine EG idling in the above condition, the microcomputer 130 determines "YES" in step 270 based on the current rotational speed Nc acquired in step 220a. The microcomputer 130 then subtracts in step 270a the latest rotational speed Nc in step 220a from the desired rotational speed Nco of the compressor 20, sets the subtraction result (Nco−Nc) into a deviation En, determines "NO" in step 280 based on n≠0 and n≠1, and computes Vn in step 280b. In this case, the driving voltage Vn−1 computed one cycle before in step 280b based on the equation (14) is equal to the driving voltage computed in step 270c one cycle before immediately after the decision in step 270 has changed to "YES" from "NO". Further, immediately after the decision in step 270 has changed to "YES" from "NO", the deviation En−1 computed one cycle before is zero (En−1=0) since execution in step 270a has not been performed one cycle before.

Then, the microcomputer 130 generates in step 290 the driving voltage Vn in step 280b as an opening degree output signal, and increments the variable n for renewal in step 290a. When the microcomputer 130 generates the opening degree output signal as a result of the affirmative (YES) judgment in step 270, the driving circuit 140 adjusts an opening degree of the idling regulator valve 10b in accordance with a value of the opening degree output signal or the driving voltage Vn acquired in step 290. This means that the idling regulator valve 10b keeps the engine EG idling with the current adjusted opening degree.

As described above in detail, when the vehicle starts running at the idling state of the engine EG, the decision in step 270 is changed to "NO" from "YES", and during repeat of this decision the driving voltage Vn is repeatedly computed according to the torque acquired in step 260a or 260b. When the engine EG becomes idling again later, the driving voltage Vn is computed in step 280b based on the driving voltage Vn−1 (i.e., the driving voltage Vn computed is step 270c) computed immediately before the decision in step 270 has become "YES", this driving voltage Vn is generated as the opening degree output signal in step 290, and the opening degree of the idling regulator valve 10b is controlled on the basis of the value of this output signal.

In other words, even when the capacity of the compressor 20 increases due to an increase of load acting on the air conditioner during the aforementioned running of the vehicle, this increase in the capacity or an increase in torque and an increase in the driving voltage Vn are repeatedly calculated. When the engine EG becomes idling again thereafter, the current driving voltage Vn is calculated using the previously increased driving voltage Vn−1 in step 280b and is generated as the opening degree output signal. Consequently, the opening degree of the idling regulator valve 10b is adjusted in accordance with the driving voltage Vn matching the increased load of the air conditioner or the increased torque of the compressor 20. As a result, even when the engine EG is conditioned in an idling state again as described above, the output of the engine EG may be secured by the increased torque of the compressor 20 or the increased flow quantity of the bypassing air through the idling regulator valve 10b immediately before that status change. Therefore, the re-idling status of the engine EG may be smoothly maintained without dropping the rotational speed. In this case, the driving voltage Vn in step 280b and the equation (14) is accurately acquired from the torque which is computed based not only on the high-pressure side refrigerant pressure Ph (this pressure Ph is associated with $\Delta T$ in step 270b) but also on a change in the pump-out volume Vc of the compressor 20 considered in step 260. Thus, the rotational speed with the engine EG again in an idling status may be maintained accurately. The pump-out volume Vc is obtained from the equations (1) and (2) and the torque Ta (or Tb) is acquired from the equations (3) and (4) (or (5)), thus simplifying the accurate torque computation and eliminating a special capacity sensor or torque sensor necessary for detecting the capacity or torque of the compressor 20.

For practice of the present invention, the arithmetic operations in and after step 230 may be executed after the rotational speed Nc is specified in step 220a to be a value in the idling state of the engine EG, for example 850 (r.p.m.), differently from the first embodiment.

For practice of the present invention, for calculating the quantity Qac of the radiated heat in the equation (12) of the first embodiment, a refrigerant temperature at the refrigerant outlet of the condenser 50 may be used in replacement of the condensed refrigerant temperature Trc.

Although in the first embodiment the refrigerant flow quantity Gr is computed based on Qac=Qrc in association with the condenser 50, the refrigerant flow quantity Gr may be acquired as follows in association with the evaporator 40. In other words, an equation (7a) showing the relationship between a quantity of radiated heat Qre of the evaporator 40 and the latent heat $\Delta i.e.$ of its refrigerant is expressed as follows in correspondence to the equation (7).

$$Qre = \Delta ie \times Gr \qquad (7a)$$

A quantity of radiated heat Qae of the evaporator 40 is specified by the following equation (12a) in correspondence to the equations (11) and (12).

$$Qae = Gae \times \Phi' \times A(Tae - Tre)k \qquad (12a)$$

wherein Tae represents a suction temperature of the evaporator 40. Tre represents a refrigerant temperature in the evaporator 40 (or a temperature at the refrigerant outlet of the evaporator 40). $Gae \times \Phi'$ is determined by an amount of air from the blower of the air conditioner. Gae represents a quantity (kg/hour) of air into the evaporator 40, and $\Phi'$ is efficiency of temperature. k is a constant of about "2".

Based on Qre=Qae corresponding to Qrc=Qac, the following equation will be satisfied in correspondence to the equation (13).

$$Gr = Gae \times \Phi' \times A(Tae - Tre)k/\Delta ie \qquad (13a)$$

Let us now consider the relation between the evaporator and the refrigerant flow quantity Gr. In general, the evaporator 40 evaporates the refrigerant from the compressor 20 and condenser 50 and discharges the evaporated refrigerant as refrigerant in gas phase. It is known that a quantity of radiated heat Qre of the evaporator 40 related to refrigerant in the evaporator 40 is associated with a refrigerant enthalpy difference $\Delta ie$ (kcal/kg) between the inlet and outlet of the evaporator 40 and further satisfies the following equation (7)'.

$$Qre = \Delta ie \times Gr \qquad (7)'$$

In such a case, $\Delta ie$ essentially corresponds to latent heat of the evaporated refrigerant and is specified by a curve (L') in association with an evaporated refrigerant temperature Tre when the refrigerant is for example R12. Approximation of this curve L' by a straight line (La') yields the following equation (8)'.

$$\Delta ie = D' - E' \times Tre \qquad (8)'$$

Thus, substituting the equation (8)' into the equation (7)' derives the following equation (9)'.

$$Qre = (D' - E' \times Tre) \times Gr \qquad (9)'$$

The quantity Qre of radiated heat of the evaporator 40 has been considered above with respect to the refrigerant in the evaporator 40. Let us now consider a quantity Qac of radiated heat at the evaporator surface. The quantity Qac of the radiated heat is specified by the following equation (10)'.

$$Qae = Gac \times \Phi' \times A \times (Tae - Tre) \times k \qquad (10)'$$

wherein Gac is a quantity (kg/hour) of air flowing into the evaporator 40, $\Phi'$ is efficiency of temperature, and A=0.24. A constant k may be a function of a temperature of sucked air.

Since Qre=Qae, $(D' - E' \times Tre) \times Gr = \Delta ie \times Gr = Gac \times \Phi' \times A \times (Tae - Tre) \times k$. Rewriting this as $Gr = \{Gac \times \Phi' \times A \times (Tae - Tre) \times k/(D' - E' \times Tre)\}$, Gr will be obtained. In other words, Gr can be predicted if Gae, Tae and Tre are measured or computed. The ambient temperature sensor 90 in the first embodiment is used as a sensor to detect a suction temperature Tae of the evaporator 40. The refrigerant temperature sensor 100 is used as a sensor to detect a refrigerant temperature Tre the evaporator 40. In this case, an evaporator sensor for detecting a temperature of air flowing out from the evaporator 40 may be used instead of the sensor for detecting the refrigerant temperature Tre.

For practice of the present invention, the pumping pressure of the compressor 20 may be directly acquired by a pressure sensor instead of obtaining the pumping pressure Ph from the equation (3).

For practice of the present invention, the foregoing description of the first embodiment has been given with reference to the case where the initial values for iding control are given in steps 270b and 270c in accordance with the torque immediately before the engine EG becomes idling, and the idling rotational speed corresponding to the torque is given from those initial values. This is premised on that as there is a little change in the capacity during idling and thus little torque variation, the idling rotational speed can be stably controlled only by the feedback control which considers a variation in the deviation En. In the case where the capacity abruptly changes even during idling, causing a torque change, however, the torque may be computed as Ta or Tb even during idling so that step 280b is executed in consideration of a change in this acquired torque to control the idling rotational speed.

Figure 3:
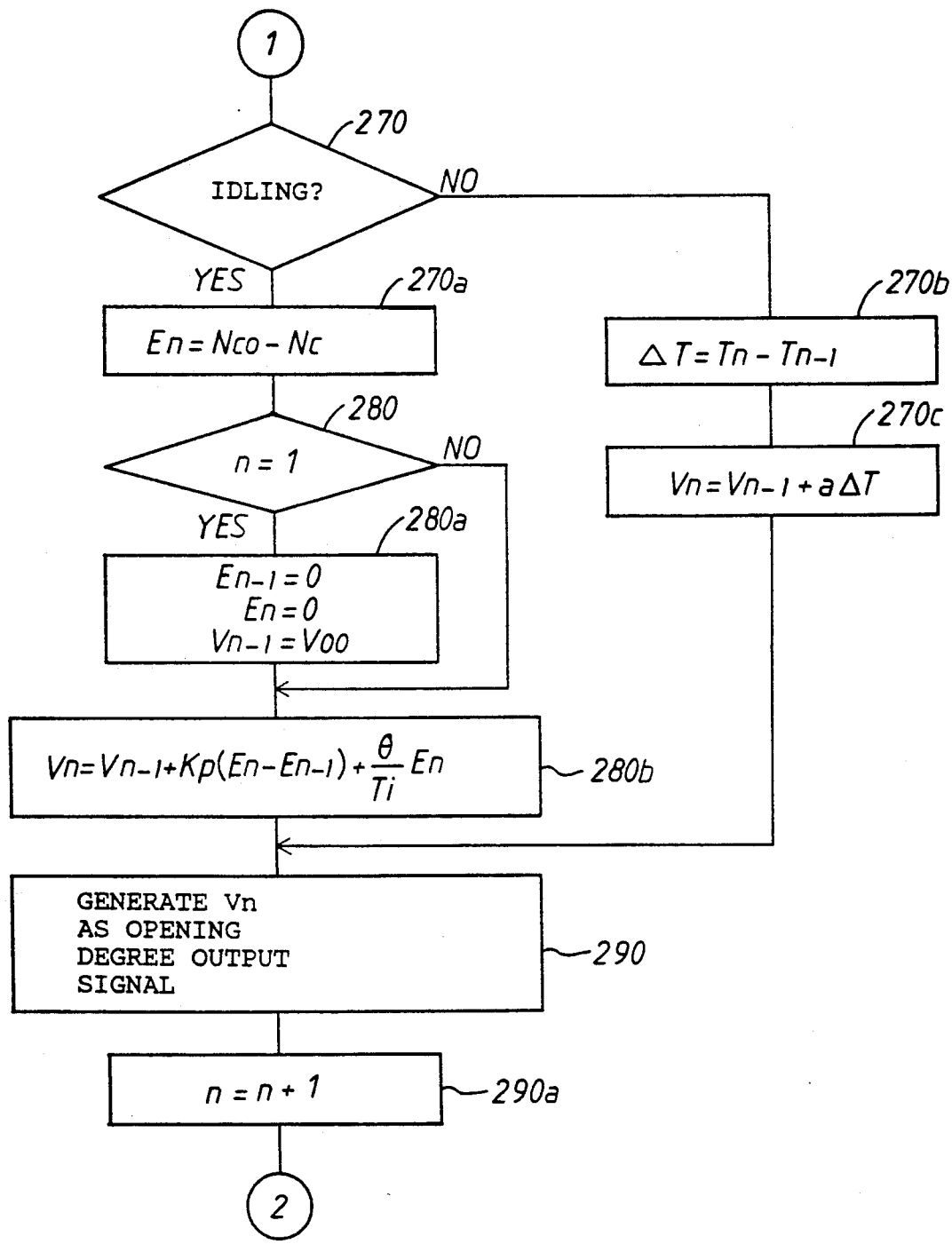

A second preferred embodiment according to the present invention will now be described. The structural features of the second preferred embodiment is characterized in that in the above-described electric circuit structure of the first preferred embodiment, a pressure sensor 100a is used in place of the refrigerant temperature sensor 100, and a vehicle speed sensor 80a and a waveform shaper 110a are added. The structural features of the second preferred embodiment is further characterized in that a computer program (hereinafter called as "a second computer program") which is specified by a modified flow chart portion (see FIG. 7) replacing the flow chart portion of FIG. 2 and by the flow chart portion of FIG. 3 is previously stored into the ROM of the microcomputer 130 described in the first preferred embodiment, instead of the computer program of the first embodiment. The vehicle speed sensor 80a detects the actual speed of the vehicle (hereinafter called as "a vehicle speed Vs") to generate a vehicle speed pulse with a frequency proportional to the vehicle speed. The pressure sensor 100a is attached to the pipe P4 near the outlet of the receiver 60 and detects high-pressure side refrigerant pressure Ph in the pipe P4 to generate a pressure detection signal. The A–D converter 120 described in the first preferred embodiment converts the pressure detection signal from the pressure sensor 100a into a digital pressure signal in addition to the analog-to-digital conversion of the ambient temperature detection signal from the ambient temperature sensor 90. The waveform shaper 110a shapes the waveform of the vehicle speed pulse from the vehicle speed sensor 80a to generate a shaped vehicle speed pulse. The other construction is substantially the same as that of the first preferred embodiment.

Figure 7:
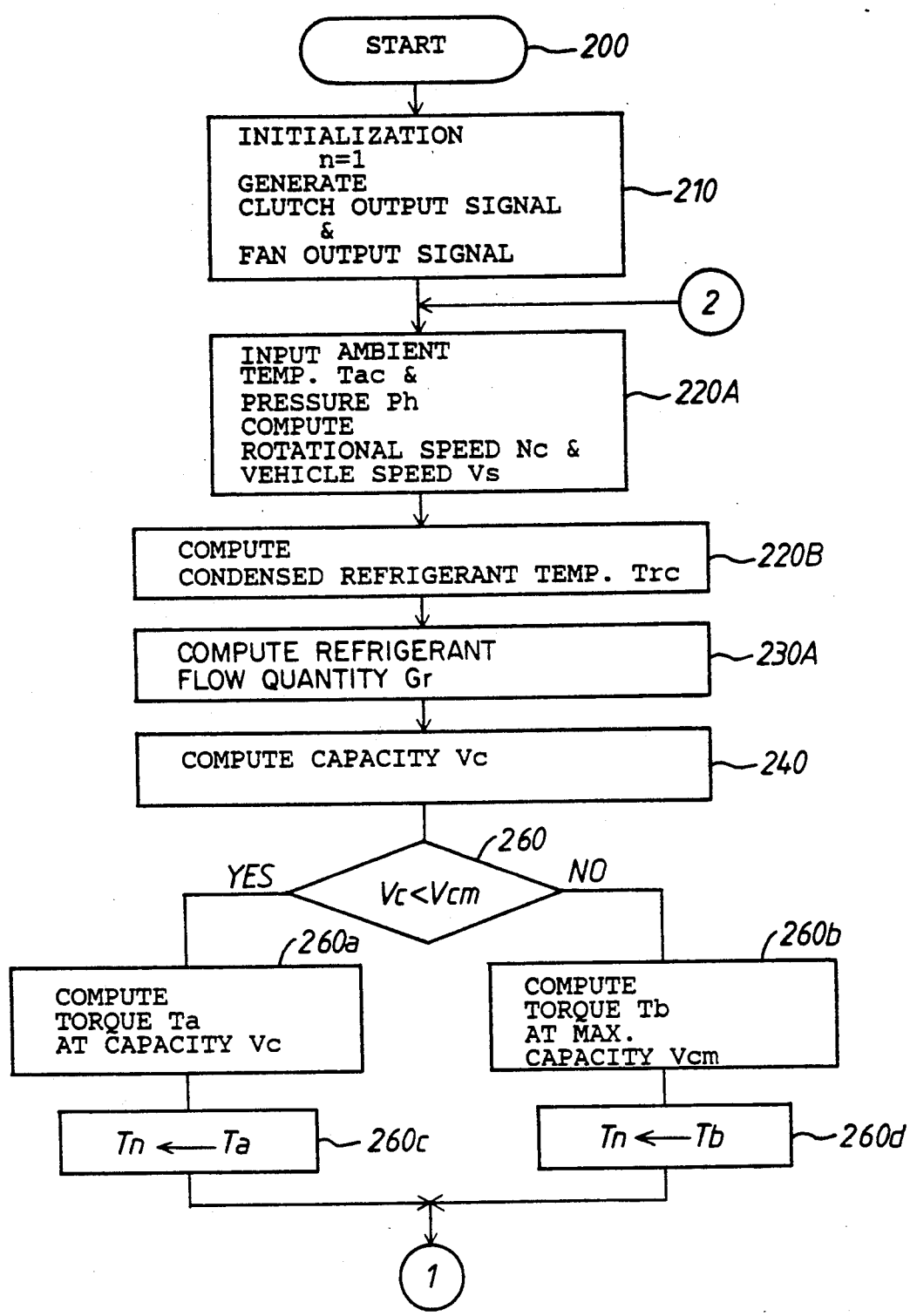
FIG. 7 presents an essential flowchart illustrating operation of the microcomputer shown in FIG. 6.

In operation, the microcomputer 130 executes the second computer program in accordance with the flow chart shown in FIGS. 7 and 3 under start of the engine EG. Then, a variable n is set to "1" through the initialization in step 210 as described in the first preferred embodiment, and engagement of the electromagnetic clutch 30 is established by generation of a clutch output signal. Consequently, transmission torque from the engine EG is transmitted through the belt mechanism 30a and electromagnetic clutch 30 to the compressor 20 so as to drive the compressor 20. The cooling fan 50a functions in the same manner as in the first embodiment. As a result, the refrigeration circuit Rc takes action to cause the evaporator 40 to cool the air flow into the vehicle compartment under the same refrigerant circulation as explained in the first preferred embodiment.

Then, in step 220A the microcomputer 130 receives an ambient temperature Tac and a value of a digital pressure signal (hereinafter called as high-pressure side refrigerant pressure Ph) from the A–D converter 120, and computes a rotational speed Nc and a vehicle speed Vs based on shaped rotational and vehicle speed pulses respectively from the waveform shapers 110 and 110a. If the engine EG is idling in the present stage, the microcomputer 130 judges "YES" in step 270 as described in the first embodiment and then performs the arithmetic operations in the individual steps starting with step 270a. In other words, when the engine EG is kept idling, the microcomputer 130 repeatedly determines "YES" in step 270 and repeats the arithmetic operations in steps 220 to 290a in substantially the same manner as in the first embodiment. Accordingly, an amount of bypassing air through the idling regulator valve 10a or an amount of air-fuel mixture to be applied to the engine EG is controlled in proportion to the driving voltage Vn in step 290 thereby to control the actual rotational speeds of the engine EG and the compressor 20 toward the desired rotational speed Nco. Furthermore, the rotational speed of the compressor 20 is controlled by $Kp \times (En - En - 1)$ in the equation (14) so as to smoothly approach the desired rotational speed Nco.

When the accelerator pedal is depressed in the above idling condition to start the vehicle, the microcomputer 130 determines "NO" in step 270 based on the latest rotational speed Nc obtained in step 220A, and performs the arithmetic operations in steps 270b and 270c as described in the first preferred embodiment. In the arithmetic operations, torque difference $\Delta T = (Tn - Tn - 1)$ and driving voltage Vn based on the equation (15) are computed. As the contents of the computations in steps 220B to 260c (or 260d) are utilized in computing those two values, this will be explained below.

When the second computer program advances to step 220B, the microcomputer 130 performs an arithmetic operation of the following equation (16) representing the relationship between the refrigerant pressure Ph and the condensed refrigerant temperature Trc on a basis of Ph acquired in step 220A to thereby compute the condensed refrigerant temperature Trc.

$$Trc = f(Ph) \qquad (16)$$

Then, in step 230A, the microcomputer 130 computes a quantity Gr (kg/hour) of refrigerant circulating through the refrigeration circuit Rc from the following equation (17) on a basis of the computed condensed refrigerant temperature Trc, the ambient temperature Tac and the vehicle speed Vs acquired in step 220A.

$$Gr = A(B + C \times Vs)(Trc - Tac)/(D - E \times Trc) tm \qquad (17)$$

This equation (17) is identical to the equation (1) with Nc replaced with Vs. In addition, the equation (17) differs from the equation (1) in that B=1200 and C=10.

The theoretical grounds for the equation (17) will now be described. Premised on the same theoretical grounds as those for the equation (1), the present inventors have experimentally recognized that the relationship between the value $(Gac \times \Phi)$ and the vehicle speed Vs is expressed by a curve Ld shown in FIG. 8, paying attention to the fact that velocity of an air flow on the outer surface of the condenser 50 corresponds to the vehicle speed Vs in the equation (10). In this case, with approximation of the curve Ld to a straight line Le, the value $(Gac \times \Phi)$ is expressed by the following equation (18).

$$Gac \times \Phi = B + C \times Vs \qquad (18)$$

Thus, the equation (10) will be rewritten into the following equation (19).

$$Qac = A(B + C \times Vs)(Trc - Tac) \quad (19)$$

where B=1200 and C=10. The value (Gac×Φ) may be considered as constant, because an air flow flowing into the evaporator 40 is only the air flow from the cooling fan 16 when the engine EG is maintained idling.

In consideration that heat of the condensed refrigerant is radiated outside through the condenser 50, it is established in substantially the same way as described in the first preferred embodiment that the quantity Qrc of radiated heat of the condensed refrigerant as defined in the equation (9) is equal to the quantity Qac of heat radiated outside from the condenser 50 as defined in the equation (19). Therefore, the above equation (17) is derived from both the equations (9) and (19). It should therefore be understood that the refrigerant flow quantity Gr may be computed with the arithmetic operation of the equation (17). The computation of the refrigerant flow quantity Gr is accomplished in step 230A (see FIG. 7).

After the computation in step 230A, the microcomputer 130 computes a capacity Vc of the compressor 20 in step 240 on a basis of the equation (2) in accordance with the refrigerant flow quantity Gr obtained in step 230A and the rotational speed Nc obtained in step 220A as described in the first embodiment. Thus, the capacity Vc of the compressor 20 is computed when the engine EG is maintained idling.

The microcomputer 130 then compares the computed capacity Vc with the maximum capacity Vcm of the compressor 20 in step 260. When Vc is less than Vcm, the microcomputer 130 determines "YES" in step 260 and computes torque Ta based on the equation (4) in step 260a and sets torque Tn in step 260c as described in the first embodiment. When Vc is equal to or greater than Vcm, the microcomputer 130 determines "NO" in step 260 and computes torque Tb based on the equation (5) in step 260b and sets torque Tn in step 260d as described in the first embodiment. After determining "NO" in step 270, the microcomputer 130 performs the arithmetic operations in steps 270b and 270c as described in the first embodiment.

Thus, immediately after the engine EG is conditioned idling, a quantity of the air flow or air-fuel mixture sucked into the engine EG is controlled in accordance with the driving torque Tn−1 for the compressor 20 during the normal running operation of the engine EG in substantially the same manner as that in the first embodiment. As a result, the necessary and sufficient quantity of air-fuel mixture is supplied into the engine EG, even when the engine EG is changingly conditioned from the normal running state to the idling state and the cooling ability of the refrigeration circuit Rc during the normal running state is maintained in any level. Therefore, the engine EG may be maintained in proper idling operation without rough idling, stolling or running at an extremely high rotational speed, even when load acting on the refrigerant circuit Rc fluctuates. In this case, the driving torque for the compressor 20 during the normal running operation can be computed using physical quantities which are relatively easily detectable ones such as the ambient temperature Tac, the rotational speed Nc, the refrigerant pressure Ph and the vehicle speed Vs. Thus, with the simple construction, the driving torque Ta and Tb for the compressor 20 can be detected and the quantity of the air-fuel mixture supplied into the engine EG during the idling state can be controlled.

As described above, the refrigerant flow quantity Gr may be estimated based on the rotational speed Nc of the compressor, the ambient temperature Tac, the condensed refrigerant temperature Trc or the air flow quantity Gae into the evaporator, and the refrigerant temperature Tre (which may be replaced with an output of the refrigerant temperature sensor 100). The pump-out capacity Vc of the compressor can be computed based on the refrigerant flow quantity Gr and rotational speed Nc. Furthermore, the torque Tn for the compressor can occasionally be computed from the refrigerant pressure Ph and pump-out capacity Vc. Thus, the driving voltage Vn for opening the idling regulator valve 10b can be determined on a basis of this torque Tn.

The Vn is determined as follows. When the engine EG is not idling, the value (a×ΔT) proportional to the difference ΔT between the torque Tn acquired in the current program cycle and the torque Tn−1 acquired in the previous program cycle is added to the previous Vn−1 to obtain the current Vn. In this manner, Vn is acquired and updated occasionally during the normal running state, for example, the running of the vehicle. This determines the driving voltage Vn for the idling regulator valve 10b on a basis of the torque Tn for the compressor at the time when the vehicle enters the idling state.

When the vehicle stops and is maintained in its idling state, it is required to finely control Vn. It is preferable to grasp a deviation En between the desired rotational speed Nco of the compressor during the idling state and the actual rotational speed Nc of the compressor and to acquire a driving voltage Vn or control output Vn in such a way to approach the actual rotational speed of the compressor to a desired rotational speed. Thus, the deviation En is acquired as En=(Nco−Nc). As the deviation En becomes greater, the control output Vn is set larger proportionally. Thus, the term (θ/Ti)×En is used in the equation for computing Vn. In this case, (θ/Ti) is a constant. In the equation for computing Vn, is used the control output Vn−1 which has been acquired in step 270c of FIG. 3 immediately before the driving operation of the vehicle changes from the running state to the idling state.

It is also preferable to compute Vn in view of a change in the deviation En. In other words, in increasing process of the deviation En, it is desired that the more a change (increased En−En−1) in the deviation En is the more a control output is given in larger value to control the deviation smaller. In this respect, the term Kp×(En−En−1) is used in the equation for computing Vn, where Kp is a constant. In an idling state when the vehicle is activated, n starts with "1" (i.e., n=1), so that the preciding deviation En−1 and the current deviation En are zero. The control output Vn−1 is set to a predetermined value at which control is started.

The rotational speed Nc in step 220a (see FIG. 2) may be assumed as a constant value of 850 (r.p.m.) instead of computing it from the engine speed, etc. The rotational speed Nc in step 220a, which is used to compute the refrigerant flow quantity Gr or the pump-out capacity Vc and further the torque Tn during idling, may be assumed constant in the computation. In this case, in steps 270b and 270c in FIG. 3, i.e., in non-idling state such as during the running of the vehicle, the torques $T_n$ and $T_n-1$ are obtained with the rotational speed of the compressor set to 850 (r.p.m.). Thus, those torques $T_n$ and $T_n-1$ do not reflect the torque for the compressor in the actual nonidling state. As the control output $V_n$ (see step 270c) is not contributing to idling control at this stage, however, taking the rotational speed as constant will not raise any problem. When the idling state is found in the above situation by some signals, the control output $V_n$ is acquired in step 280b during the idling state. In this case, it is possible to know whether or not the engine EG is idling by various known methods, such as checking of an opening degree of the throttle valve. The rotational speed $N_c$ used in step 270a should not however be set to a constant of 860 (r.p.m.). Since this rotational speed $N_c$ is used to acquire the deviation $E_n$ which is the base of the control, the rotational speed during idling should be obtained accurately.

According to the present invention, the torque for the compressor is not directly measured using a complicated mechanism such as a torque meter, but it is computed in accordance with a signal representing the high-pressure side refrigerant pressure $P_h$, a signal representing the rotational speed $N_c$ of the compressor and a signal representing the refrigerant flow quantity $G_r$, and based on the thus computed torque, the control output is given to a means for adjusting the idling rotational speed. This invention can therefore be worked without using an expensive torque meter. As the torque is obtained in accordance with a change in the pump-out capacity $V_c$, the idling rotational speed can be controlled while relatively reflecting the torque variation of the compressor to the control. Furthermore, the pump-out capacity $V_c$ is acquired from the refrigerant flow quantity $G_r$ and the rotational speed $N_c$ to obtain the torque. In addition, the refrigerant flow quantity $G_r$ is obtained from the rotational speed $N_c$, the condensed refrigerant temperature $T_{rc}$ and the ambient temperature $T_{ac}$, thus eliminating the need for a special sensor. The rotational speed may be substituted with the number of revolutions of the engine or the vehicle speed.

The torque is simply computed because the torque $T$ which matches the pump-out capacity is computed by selectively using two torque computing equations, depending on whether the computed pump-out capacity $V_c$ is greater or smaller than a predetermined value. In addition, the relationship between the pump-out capacity $V_c$ and the torque may be stored as a map in a memory so that the proper torque value can be read out from the map. Further, no special sensor is needed to detect the refrigerant flow quantity because the refrigerant flow quantity is obtained from the quantity $G_{ae}$ (which can be estimated from the voltage applied to the blower motor, etc.) of air flowing into the evaporator, the suction temperature $T_{ac}$ of the evaporator (which may be replaced with the ambient temperature) and the refrigerant temperature $T_{re}$ in the evaporator (which may be the value of the output from the refrigerant temperature sensor for measuring the surface temperature of the condenser).

Since the pump-out capacity $V_c$ is computed, the torque $T_n$ is obtained from this pump-out capacity $V_c$ in each predetermined program cycle. In this case, the number of repeating cycles is set to "n". There are provided a means to determine if the engine is idling and a means which, when the engine is not idling, acquires the control output $V_n$ corresponding to the torque $T_n$ in each occasion and adjusts the number of idling rotations with this control output. Thus, immediately before the idling state, the means for controlling the idling rotational speed is driven to the position which reflects the torque $T_n$ of the compressor immediately before the transition. In other words, when the torque is large, the opening degree of the idling regulator valve, for example, is maintained in a large value. The response to control immediately after the idling can therefore be improved. If the idling regulator valve is closed when the torque is large immediately before idling, the gap between the actual and desired opening degrees of the valve after the idling state of the engine is increased to cause hunting or the like. In another embodiment, the refrigerant flow quantity $G_r$ is obtained using the vehicle speed $V_s$, ambient temperature $T_{ac}$ and condensed refrigerant temperature $T_{rc}$, because the relationship between a product of the quantity $G_{ac}$ of air flowing into the condenser and the heat efficiency $\Phi$ and the vehicle speed $V_s$ can be approximated by a line.

After the pump-out capacity $V_c$ is found, the first torque $T_a$ is computed using the calculated pump-out capacity $V_c$, the second torque $T_b$ is computed using the maximum capacity $V_{cm}$, and the final torque to be acquired is determined using a smaller one of the first and second torques. That is, it is difficult to acquire only the high-pressure side refrigerant pressure $P_h$ and pump-out capacity $V_c$ as variables in order to compute the torque, and it is actually desirable to compute the low-pressure side refrigerant pressure $P_s$ as a variable. Since this complicates the system, the low-pressure side refrigerant pressure $P_s$ is assumed to be a constant, and the torques are obtained using two parameters, pump-out capacity $V_c$ and maximum pump-out capacity $V_{cm}$, and a smaller torque value is selected to change the torque characteristic in a polygonal line for approximation to the actual torque curve. The other operations and effects are the same as those of the first embodiment.

In the second embodiment, the condensed refrigerant temperature $T_{rc}$ necessary for computing the driving torque $T_a$ and $T_b$ for the compressor 20 is calculated based on the high-pressure side refrigerant pressure $P_h$ detected by the pressure sensor 100a. Since the high-pressure side refrigerant pressure $P_h$ is in one-to-one correspondence to the condensed refrigerant temperature $T_{rc}$, however, the condensed refrigerant temperature $T_{rc}$ may be detected instead of the high-pressure side refrigerant pressure $P_h$ to compute the pressure $P_h$ so as to compute the volume $V_c$ as well as the torque $T_a$ and $T_b$. In this case, it is desirable to provide a temperature sensor at the outlet portion of the condenser 50 or in the pipe P3 connected to the condenser 50 and to use the refrigerant temperature directly detected by this sensor as the condensed refrigerant temperature $T_{rc}$.

In computing the driving torque $T_a$ and $T_b$ based on the equations (4) and (5), the high-pressure side refrigerant pressure $P_h$ may be considered as a constant and only the capacity $V_c$ may be treated as a variable, which will cause slight reduction in accuracy.

Furthermore, in the second embodiment, when the driving state of the engine EG changes from the normal running state to the idling state, the driving voltage $V_n - 1$ corresponding to the driving torque for the compressor 20 in the normal running state immediately before the idling state of the engine EG is given as the initial value of the driving voltage $V_n$ in the normal running state to control the quantity of the air-fuel mixture sucked into the idling engine EG. This is however premised on that as there is a little change in the capacity of the compressor 20 during the idling state and thus a little torque variation, the idling rotational speed can be stably controlled only by the feedback control involving the desired rotational speed Nco. In the case where the capacity of the compressor 20 abruptly changes even during the idling state, causing a torque change, however, the torque may be detected to control the quantity of air-fuel mixture to be supplied to the engine.

Figure 9:
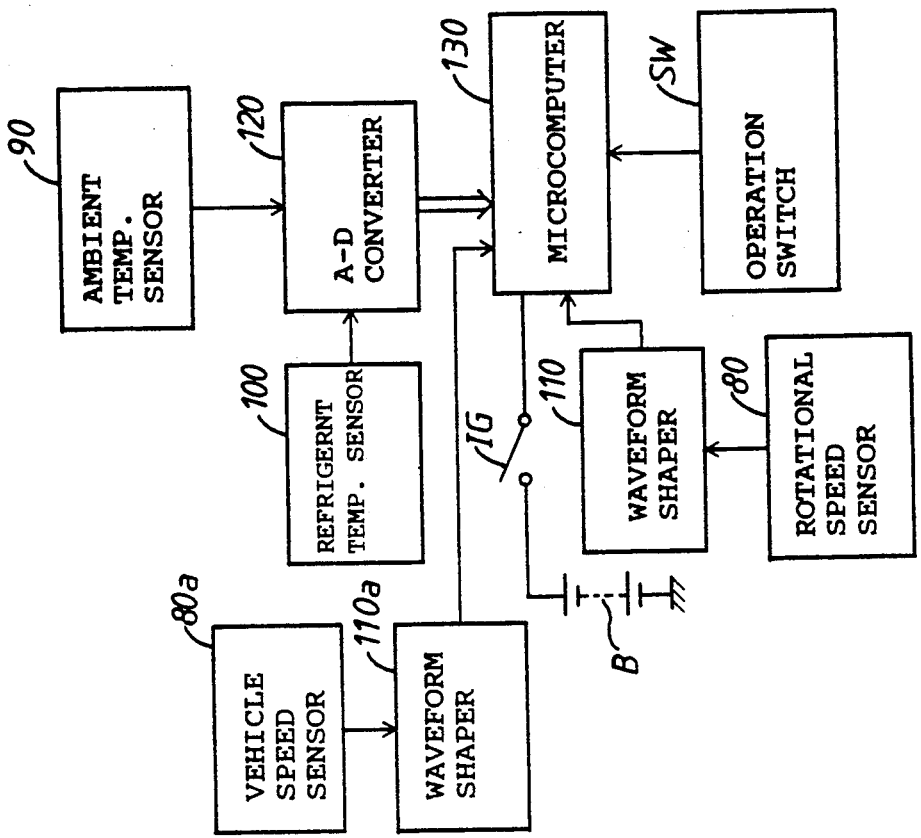
FIG. 9 is a block diagram illustrating essential portions of a third preferred embodiment in accordance with the present invention.
Figure 6:
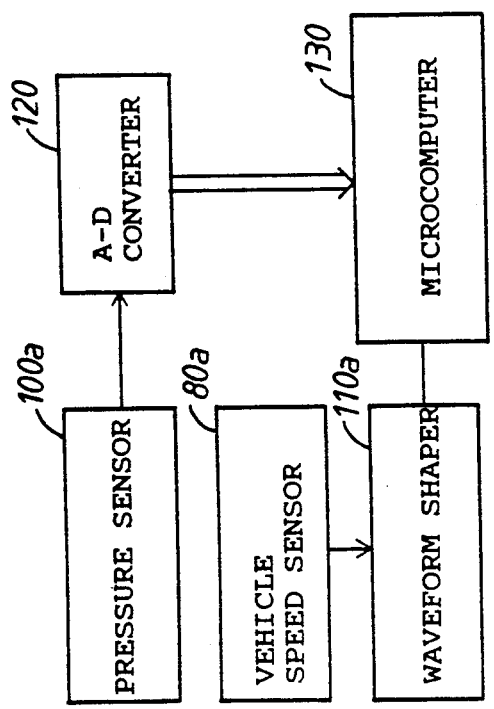
FIG. 6 is a block diagram illustrating essential portions of a second preferred embodiment in accordance with the present invention.
Figure 10:
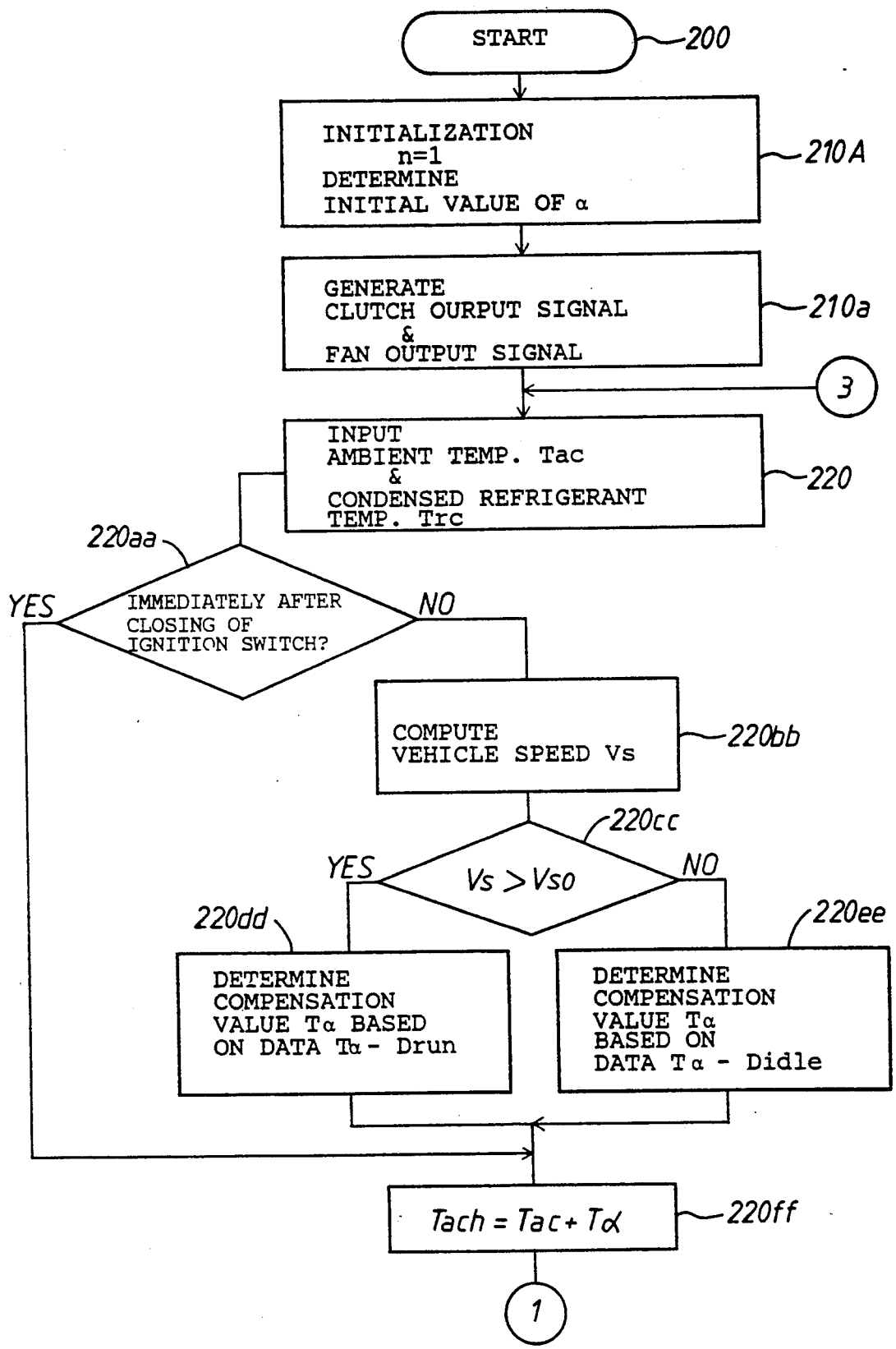
FIGS. 10 and 11 present a flow chart illustrating operation of the microcomputer shown in FIG. 9.
Figure 11:
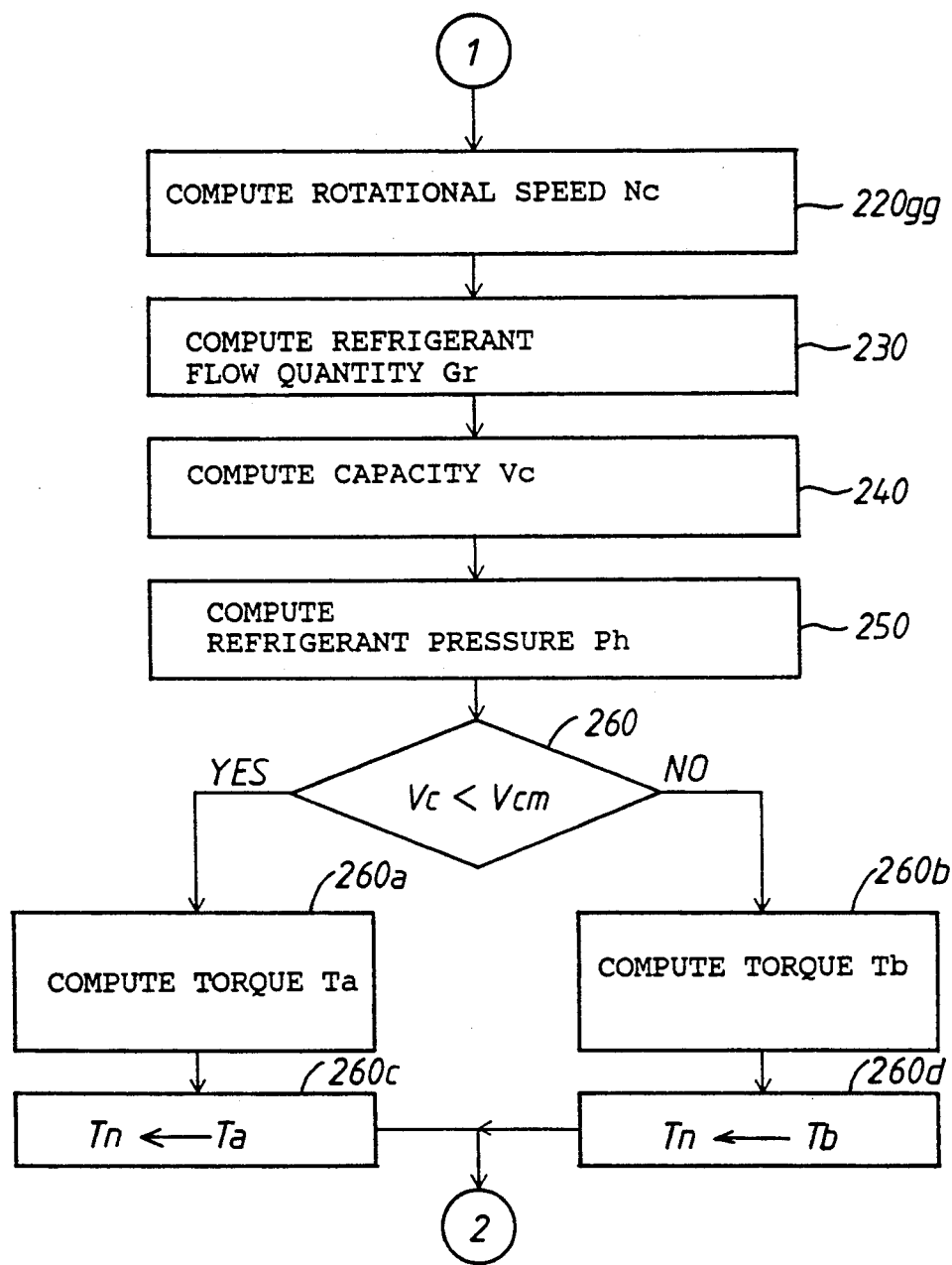

A third preferred embodiment in accordance with the present invention will now be described. The third preferred embodiment is characterized in that in the above-described electric circuit construction of the first embodiment, a vehicle speed sensor 80a and a waveform shaper 110a (see FIG. 9) are additionally adopted. The third preferred embodiment is further characterized in that a computer program (hereinafter called "a third computer program") which is specified by flow chart portions as shown in FIGS. 10 and 11 replacing the flow chart portion of FIG. 2 and the flow chart portion of FIG. 3 is previously stored into the ROM of the microcomputer 130 described in the first embodiment instead of the computer program of the first embodiment. The vehicle speed sensor 80a detects the actual speed of the vehicle to generate a vehicle speed pulse with a frequency proportional to the detected speed. The waveform shaper 110a shapes the waveforms of the individual vehicle speed pulses from the vehicle speed sensor 80a sequentially to generate them as shaped vehicle speed pulses. The other construction is substantially the same as that of the first embodiment.

In the third preferred embodiment, the present inventors have confirmed that the torque of the compressor 20 can be determined in consideration of both the high-pressure side refrigerant pressure and the capacity of the compressor 20 as in the first embodiment and that the ambient temperature Tac necessary for computing the torque of the compressor 20 should be compensated in association with the ambient temperature sensor 90 for the following reason. When the vehicle runs, the outside air passes the front grill and flows into the condenser 50 through its inlet. Thus, a temperature of the air at the inlet of the condenser 50 almost matches a temperature outside the vehicle or a temperature detected by the ambient temperature sensor 90.

When the vehicle is not moving, however, there is no outside air flowing into the condenser 50. When the engine's idling state continues for a long time in such conditions, hot air would come around to the inlet of the condenser 50 from the engine, raising a temperature of the air at the inlet of the condenser 50. Since the ambient temperature sensor 90 is provided in the outside air inlet portion of the front grill, a temperature detected by the sensor 90 will not be affected by the hot air and would match a temperature outside the vehicle. The temperature of the air at the inlet of the condenser 50 therefore rises above the temperature outside the vehicle or the temperature detected by the ambient temperature sensor 90. When the vehicle is conditioned in its running state as described above, the rise of the temperature of the air at the inlet of the condenser 50 will stop as the running of the vehicle continues, because the outside air enters the condenser 50 from the inlet.

From the above, it is apparent that when the vehicle changes its state to the running state from the idling state or vice versa, unless the ambient temperature Tac is compensated to approach the temperature of the air at the inlet of the condenser 50 according to the time elapsing after the transition, there may be a case where the temperature outside the vehicle detected by the temperature sensor 90 does not correspond to the temperature of the air at the inlet of the condenser 50. This may result in inaccurate torque computation.

Because of the above grounds, the present inventors have employed the following equation (20) to compensate the ambient temperature Tac.

$$Tach = Tac + T\alpha \quad (20)$$

where Tach represents a compensated value of the ambient temperature Tac. In specifying the compensation value $T\alpha$, the following data is introduced. The data includes data $T\alpha$−Didle (see FIG. 13) representing the relationship between the time elapsing after the vehicle stops running (hereinafter called "elapse time Didle") and the compensation value $T\alpha$, and data $T\alpha$−Drun (see FIG. 14) representing the relationship between the time elapsing after the vehicle starts running from the idling state (hereinafter called "elapse time Drun") and the compensation value $T\alpha$. It is to be noted that the idling state of the vehicle corresponds to the vehicle speed Vs equal to or lower than a predetermined low speed Vso (e.g., 6.5 (km/h)).

Figure 13:
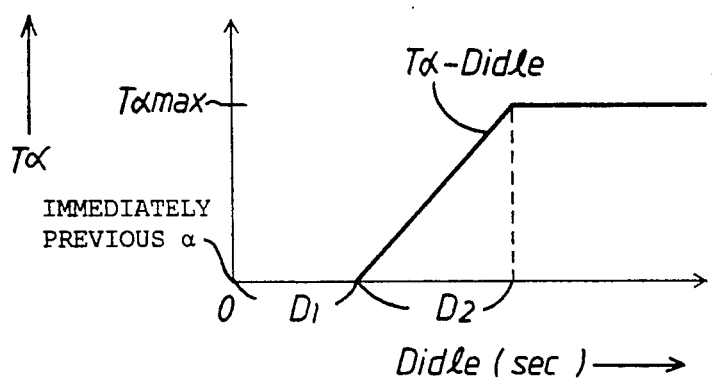
FIG. 13 is a graph specifying data representing the relationship between a compensation value of the outside air temperature and a time elapsing after stop of the vehicle running.
Figure 14:
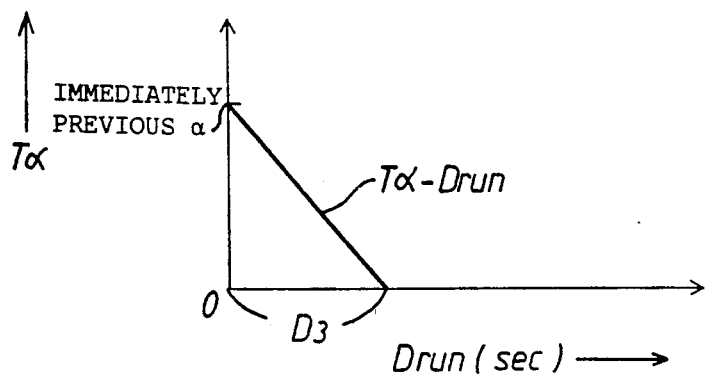
FIG. 14 is a graph specifying data representing the relationship between a compensation value of the outside air temperature and a time elapsing after starting of the vehicle.

As shown in FIG. 13, the data $T\alpha$−Didle is such that the compensation value $T\alpha$ increases with a positive inclination of $(T\alpha max/D2)$ in $D1 \leq Didle \leq D2$ after the waste time D1 with a value immediately before the transition of the vehicle's state to the idling state from the running state as a reference, and then takes a maximum value of T max. As shown in FIG. 14, the data $T\alpha$−Drun is such that the compensation value $T\alpha$ decreases with a negative inclination of $(T\alpha max/D3)$ in $0 \geq Drun \geq D3$ with a value immediately before the transition of the vehicle's state to the running state from the idling state as a reference, and then becomes zero. In this case, $T\alpha max$ represents the maximum value of the compensation value $T\alpha$ which is predicted in compensating the ambient temperature Tac. The equation (20), the predetermined low speed Vso, the data $T\alpha$−Didle and the data $T\alpha$−Drun are previously stored in the ROM of the microcomputer 130.

Figure 12:
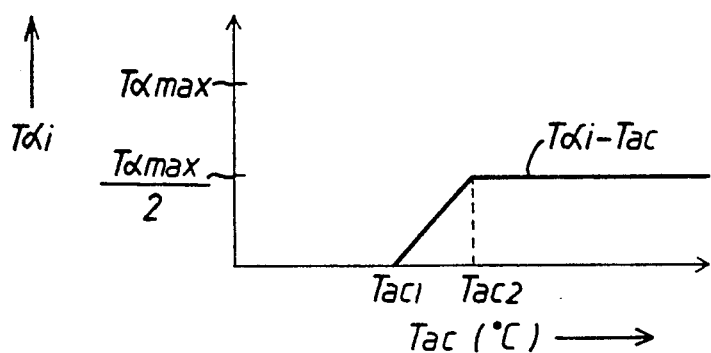
FIG. 12 is a graph specifying data representing the relationship between an initial value of a compensation value of an outside air temperature and the outside air temperature.

The present inventors also introduced an initial value $Tai$ of the compensation value $T\alpha$. The state immediately after the closing of the ignition switch IG is the one immediately after the engine becomes idling, so that the air coming around toward the inlet of the condenser 50 is not hot air. It is therefore expected that the temperature of the air at the inlet of the condenser 50 would greatly be affected by the temperature outside the vehicle. In this respect, the initial value $Tai$ of the compensation value $T\alpha$ is specified by the following data in order to initially compensate the compensation value $T\alpha$ separately from the above data $T\alpha$−Didle and $T\alpha$−Drun. More specifically, data $Tai$−Tac (see FIG. 12) which shows the relationship between the initial value $Tai$ immediately after the ignition switch IG is closed and the ambient temperature Tac is introduced. As shown in FIG. 12, this data $Tai$−Ta is such that the initial value $Tai$ is zero in $0 \leq Tac \leq Tac1$, changes with a positive inclination of $\{T\alpha max/2(Tac2-Tac1)\}$ in $Tac1 \leq Tac \leq Tac2$, and becomes $(T\alpha max/2)$ when $Tac2 \leq Tac$. The data $Tai$−Tac is previously stored in the ROM of the microcomputer 130.

In operation, under start of the engine EG, the microcomputer 130 executes the third computer program in accordance with the flow chart shown in FIGS. 10, 11 and 3. Then, the microcomputer 130 executes the initialization in step 210A to set a variable n to "1". In the initialization in step 210A, the microcomputer 130 further determines the initial value $T\alpha i$ of the compensation value $T\alpha$ to compensate the ambient temperature Tac from the A-D converter 120 based on the data $T\alpha i - Tac$ (see FIG. 12) in accordance with the ambient temperature Tac.

When the initialization in step 210A is completed, the microcomputer 130 generates a clutch output signal and a fan output signal in step 210a. Consequently, the electromagnetic clutch 30 is engaged by the driving circuit 150 in response to the clutch output signal from the microcomputer 130, and the compressor 20 is driven with power supplied via the belt mechanism 30a and electromagnetic clutch 30 from the engine EG. The cooling fan 50a is driven by the driving circuit 160 in response to the fan output signal from the microcomputer 130.

In the refrigeration circuit Rc, the compressor 20 takes in and compresses refrigerant from the pipe P1 in accordance with the capacity and discharges it as high-temperature and high-pressure compressed refrigerant into the pipe P2. The condenser 50 then condenses the compressed refrigerant from the pipe P2 under the cooling effect of the cooling fan 50a to supply it as condensed refrigerant into the pipe P3. Subsequently, the receiver 60 supplies a liquid phase component of the condensed refrigerant from the pipe P3 as circulating refrigerant into the pipe P4, and the expansion valve 70 expands the refrigerant from the pipe P4 in accordance with the temperature of the refrigerant in the pipe P1 and supplies it to the evaporator 40 cools an air flow thereinto in accordance with the evaporating effect of the supplied refrigerant.

After the arithmetic operation in step 210a is performed, the microcomputer 130 receives an ambient temperature Tac and a condensed refrigerant temperature Trc from the A-D converter 120 in step 220, and determines "YES" in step 220aa as it is immediately after the ignition switch IG has been closed. Then, the microcomputer 130 computes a compensated ambient temperature Tach in step 220ff based on the equation (20) in accordance with the ambient temperature Tac and the compensation value $T\alpha$ = initial value $T\alpha i$. The microcomputer 130 computes a rotational speed Nc of the compressor 20 based on rotational speed pulses from the waveform shaper 110 in step 220gg, and then computes a refrigerant flow quantity Gr (kg/hour) in the refrigeration circuit Rc in the next step 230 based on the following equation (21) in accordance with the condensed refrigerant temperature Trc acquired in step 220 and the compensated outer temperature Tach acquired in step 220ff as well as the rotational speed Nc acquired in step 220gg.

$$Gr = A(B + C \times Nc)(Trc - Tach)/(D - E \times Trc) \quad (21)$$

This equation (21) is equivalent to the equation (13) with Tach substituted for Tac and is previously stored in the ROM of the microcomputer 130.

Then, the microcomputer 130 computes a pump-out capacity Vc (cc) of the compressed refrigerant of the compressor 20 in step 240 on a basis of the equation (2) in accordance with the computed refrigerant flow quantity Gr and the rotational speed Nc obtained in step 220gg. In the subsequent step 250, the microcomputer 130 computes a high-pressure side refrigerant pressure Ph of the refrigeration circuit Rc based on the equation (3) in accordance with the condensed refrigerant temperature Trc acquired in step 220. When the computed pump-out capacity Vc is equal to or less than the maximum pump-out capacity Vcm of the compressor 20 in the present stage, the microcomputer 130 judges "YES" in step 260 and computes torque Ta for the compressor 20 based on the equation (4) in accordance with the high-pressure side refrigerant pressure Ph acquired in step 250. When Vc is larger than Vcm, on the other hand, the microcomputer 130 judges "NO" in step 260 and computes torque Tb for the compressor 20 based on the equation (5) in accordance with the high-pressure side refrigerant pressure Ph acquired in step 250.

When the arithmetic operation in step 260a or 260b is completed as described above, the microcomputer 130 sets the torque Ta to Tn in step 260c after the step 260a and sets the torque Tb to Tn in step 260d after the step 260b. When the rotational speed of the engine EG is maintained between 600 (r.p.m.) and 700 (r.p.m.), the microcomputer 130 considers that the engine EG is idling, and judges "YES" in step 270 in association with the rotational speed Nc obtained in step 220gg. The microcomputer 130 then executes the arithmetic operations in individual steps 270a to 290a (see FIG. 3) in the same manner as that in the first embodiment. Consequently, an amount of bypassing air flowing from the upstream of the throttle valve 10a to the downstream through the bypass passage 10c is adjusted by the desired opening degree of the idling regulator valve 10b to keep the engine EG idling as described in the first embodiment.

When the accelerator pedal is depressed to start the vehicle with the engine EG set in the idling state, the microcomputer 130 determines "YES" in step 220aa as previously described and then advances the third computer program to step 270 where it determines "NO" based on the latest rotational speed Nc acquired in step 220gg. Then, the microcomputer 130 performs execution in steps 270b and 270c to compute a torque difference ΔT and a driving voltage Vn and performs execution in steps 290 and 290a to generate the driving voltage Vn as an opening degree output signal, as described in the first embodiment. As a result, an amount of bypassing air flowing from the upstream of the throttle valve 10a to the downstream through the bypass passage 10c is adjusted by the desired opening degree of the idling regulator valve 10b as described in the first embodiment. At this time, a flow quantity of the air through the throttle valve 10a in the suction passage 10 is controlled in accordance with an opening degree of the throttle valve 10a.

When the decision in step 220aa becomes "NO" later, the microcomputer 130 computes a vehicle speed Vs based on individual shaped vehicle speed pulses from the waveform shaper 80a. When the vehicle speed Vs is higher than the predetermined low speed Vso in the present stage, the microcomputer 130 judges "YES" in step 220cc and advances the third computer program to step 220dd. In this step 220dd, the microcomputer 130 sets the initial value $T\alpha i$ obtained in step 210A into a compensation value $T\alpha$ immediately before the present stage. Then, the microcomputer 130 sets the data $T\alpha - Drun$ (see FIG. 14) with the aforementioned negative inclination of $(T max\alpha/D3)$ based on the initial value Tai, and determines a compensation value Tα based on this set data according to the elapse time Drun after the affirmative (YES) judgment in step 220cc. The microcomputer 130 then computes a compensated ambient temperature Tach in step 220ff on a basis of the equation (20) according to the current ambient temperature Tac in step 220.

In individual steps 220gg to 250, the microcomputer 130 computes a refrigerant flow quantity Gr based on the equation (21) in accordance with the computed compensated ambient temperature Tach, the current condensed refrigerant temperature Trc and rotational speed Nc, computes the pump-out capacity Vc based on the equation (2) in accordance with the computed refrigerant flow quantity Gr and the rotational speed Nc, and computes high-pressure side refrigerant pressure Ph based on the equation (3) as described above. Based on the results of those arithmetic operations, the microcomputer 130 executes the arithmetic operations in steps 260 to 260d, judges "NO" in step 270 and performs the arithmetic operations in steps 270b to 290a in substantially the same manner as described previously. Accordingly, an amount of bypassing air flowing through the regulator valve 10b from the upstream of the throttle valve 10a in substantially the same manner as described above.

In the case where the execution of the arithmetic operations results in repetitive judgment of "NO" in step 270 during the running state of the vehicle, the microcomputer 130 repeatedly computes torque Ta or Tb through computation of the refrigerant flow quantity Gr, the capacity Vc and high-pressure side refrigerant pressure Ph on a basis of the individual equations (2), (21) and (3) to (5). In this case, the ambient temperature Tac is compensated in accordance with the initial value Tai based on the data Tai−Tac (see FIG. 12) immediately after the closing of the ignition switch IG, and is compensated in accordance with the compensation value Tα based on the data Tα−Drun (see FIG. 14) when the vehicle is running thereafter. Thus, the refrigerant flow quantity Gr, capacity Vc and torque Ta or Tb are computed in the light of the compensated ambient temperature Tach. The microcomputer 130 then repeatedly computes a difference between the previous and latest torques Ta (or Tb) as a torque difference ΔT in step 270b, repeatedly computes in step 270c a driving voltage Vn based on the equation (15) according to a driving voltage Vn−1 and torque difference ΔT, and generates the driving voltage Vn as an opening degree output signal in step 290. When Vc<Vcm is established, it is easily understood from the equation (15) that Tb is determined so as to vary in proportion to a change in Vc. In other words, the driving voltage Vn is repeatedly determined based on the equation (15) always with the latest torque difference ΔT.

When the vehicle is stopped in the above condition to set the engine EG idling, the microcomputer 130 determines "NO" based on Vs≦Vso in step 220cc and advances the third computer program to step 220ee. In this step 220ee, the microcomputer 130 sets the latest compensation value Tα in step 220dd into a compensation value Value Tα immediately before the present stage and sets the data Tα−Didle (see FIG. 13) with the aforementioned positive inclination of (Tα max/D2) based on the latest compensation value Tα. Furthermore, in step 220ee, the microcomputer 130 determines the compensation value Tα based on this set data in accordance with the elapse time Didle after the negative "NO" judgment in step 220cc. Then, the microcomputer 130 computes a compensated ambient temperature Tach in step 220ff on a basis of the equation (20) in accordance with the current ambient temperature Tac in step 220.

In individual steps 220gg to 250, the microcomputer 130 computes a refrigerant flow quantity Gr on a basis of the equation (21) in accordance with the computed compensated ambient temperature Tach, the current condensed refrigerant temperature Trc and rotational speed Nc and computes a pump-out capacity Vc based on the equation (2) in accordance with the computed refrigerant flow quantity Gr and the rotational speed Nc. Then, the microcomputer 130 computes high-pressure side refrigerant pressure Ph based on the equation (3) as described above and determines "YES" in step 270 based on the current rotational speed Nc in step 220gg.

Thereafter, in step 270a the microcomputer 130 subtracts the latest rotational speed Nc in step 220gg from the desired rotational speed Nco of the compressor 20 to set the subtraction result (Nco−Nc) as a deviation En. Then, the microcomputer 130 judges "NO" in step 280 based on n≠1, and computes Vn in step 280b based on the equation (14) in accordance with the driving voltage Vn−1 computed one cycle before (equal to the driving voltage computed in step 270c one cycle before immediately after the decision in step 270 becomes "YES" from "NO"), the deviation En−1 computed one cycle before and the latest deviation En acquired in step 270a.

The microcomputer 130 then generates the driving voltage Vn in step 280b as an opening degree output signal in step 290 and increments the variable n for renewal in step 290a. When the microcomputer 130 generates the opening degree output signal as a result of the affirmative "YES" judgment in step 270, as previously described, the driving circuit 140 adjusts the actual opening degree of the idling regulator valve 10b in accordance with a value of the opening degree output signal or the driving voltage Vn acquired in step 290. This means that the idling regulator valve 10b keeps the engine EG idling state with the current adjusted opening degree.

As described above, when the vehicle is started at the idling state of the engine EG immediately after the closing of the ignition switch IG, the third computer program is repeatedly executed under repetitive decisions "NO" in 270. In other words, during the repetitive execution of the third computer program, the microcomputer 130 repeatedly computes in steps 230 to 250 the refrigerant flow quantity Gr, capacity Vc and refrigerant pressure Ph based on the equations (21), (2) and (3) respectively, and further computes the torque Ta (or torque Tb) based on the equation (4) (or the equation (5)) in step 260a (or step 260b) in accordance with the repetitive decisions in step 260.

Thus, the torque Ta in step 260a (or the torque Tb in step 260b) is accurately computed based not only on the high-pressure side refrigerant pressure Ph but also on a change in the capacity Vc of the compressor 20. As a result, the accurate torque computation may be easily accomplished and no special capacity sensor or torque sensor is required to detect the capacity and torque of the compressor 20. Furthermore, prior to the computation of the torque in step 260a or step 260b immediately after the closing of the ignition switch IG, the ambient temperature Tac is compensated as the compensated ambient temperature Tach based on the data Tαi−Tac, and thereafter the ambient temperature Tac is compensated based on the data Tα−Drun according to the elapse time Drun to compute the refrigerant flow quantity Gr based on the equation (4) according to the compensated ambient temperature Tach. Thus, torque Ta or Tb may be computed accurately in consideration of the compensation value of the ambient temperature Tac immediately after the closing of the ignition switch IG.

In this case, the data Tαi−Tac or data Tα−Drun is set based on the compensation value Tα upon the decision "YES" in step 220a or step 220c, as described above. Thus, the precision of the torque computation may be maintained highly, if a temperature detected by the ambient temperature sensor 90 differs from a temperature at the inlet of the condenser 50. Accordingly, the running condition of the vehicle may be smoothed by properly adjusting an amount of bypassing air through the idling regulator valve 10b immediately after the closing of the ignition switch IG or thereafter.

Furthermore, the driving voltage Vn is repeatedly computed according to the torque set in step 260c or 260d. Thus, it should be understood that when the vehicle is stopped to set the engine EG idling again, the driving voltage Vn is computed in step 280b based on the driving voltage Vn−1 computed immediately before the affirmative "YES" decision in step 270, i.e., based on the driving voltage Vn computed in step 270c. It should be also understood that the computed driving voltage Vn is generated as the opening degree output signal in step 290 to adjust the opening degree of the idling regulator valve 10b in accordance with the value of the opening degree output signal. As a result, the rotational speed in the re-idling state of the engine EG may always be maintained accurately and properly within the proper torque range.

In other words, even when the capacity of the compressor 20 increases due to an increase of the load acting on the air conditioner during the aforementioned running of the vehicle, the increase in the capacity or increases in torque and the driving voltage Vn are repeatedly computed in step 260a (or 260b) and step 270c. When the engine EG is again conditioned in idling later, the current driving voltage Vn is computed using the previous increased driving voltage in step 280b to be generated as the opening degree output signal in step 290. Consequently, the opening degree of the idling regulator valve 10b is controlled in accordance with the driving voltage Vn matching the increased load acting on the air conditioner or the increased torque for the compressor 20. Even when the engine EG is set idling again as described above, therefore, the output of the engine EG can be secured by the increased torque of the compressor 20 or the increased flow quantity of the bypassing air through the idling regulator valve 10b immediately before that status change. As a result, the reidling condition of the engine EG can be smoothly maintained without dropping the rotational speed.

When the decision in step 220cc becomes "YES" with the vehicle set again in the running state, the microcomputer 130 sets the data Tα− Drun in step 220dd on a basis of the latest compensation value Tα acquired in step 220ee, and then determines a compensation value Tα according to the elapse time Drun after judging "YES" in step 220cc. Then, the microcomputer 130 computes a compensated ambient temperature Tach in step 220ff on a basis of the equation (10) according to the compensation value Tα and in turn executes the arithmetic operations in steps 220gg to step 290 based on the compensated ambient temperature Tach in substantially the same manner as described previously.

In this case, even when a temperature at the inlet of the condenser 50 becomes higher than a temperature detected by the ambient temperature sensor 90 due to hot air coming around toward the inlet of the condenser 50 from the idling engine EG before the vehicle starts running again, the compensated ambient temperature Tach is acquired to compute torque in accordance with the data Tα− Drun which has previously been set on a basis of the compensation value Tα acquired in step 220ee responsive to the decision "YES" in step 220cc. Thus, higher accuracy in the torque computation may be ensured even when the ambient temperature sensor 90 is located apart from the inlet of the condenser 50. As a result, the running condition of the vehicle may be smoothed by properly adjusting the amount of bypassing air through the idling regulator valve 10b. The other operation and effect are the same as those of the first embodiment.

A fourth preferred embodiment in accordance with the present invention will now be described. The fourth preferred embodiment is characterized in that a computer program (hereinafter called as "a fourth computer program") which is specified by a modified flow chart portion (see FIG. 15) replacing the flow chart portion of FIG. 7 and the flow chart portion of FIG. 3 is previously stored into the ROM of the microcomputer 130 described in the second embodiment, instead of the second computer program of the second embodiment. The other construction is substantially the same as that of the second embodiment.

Figure 15:
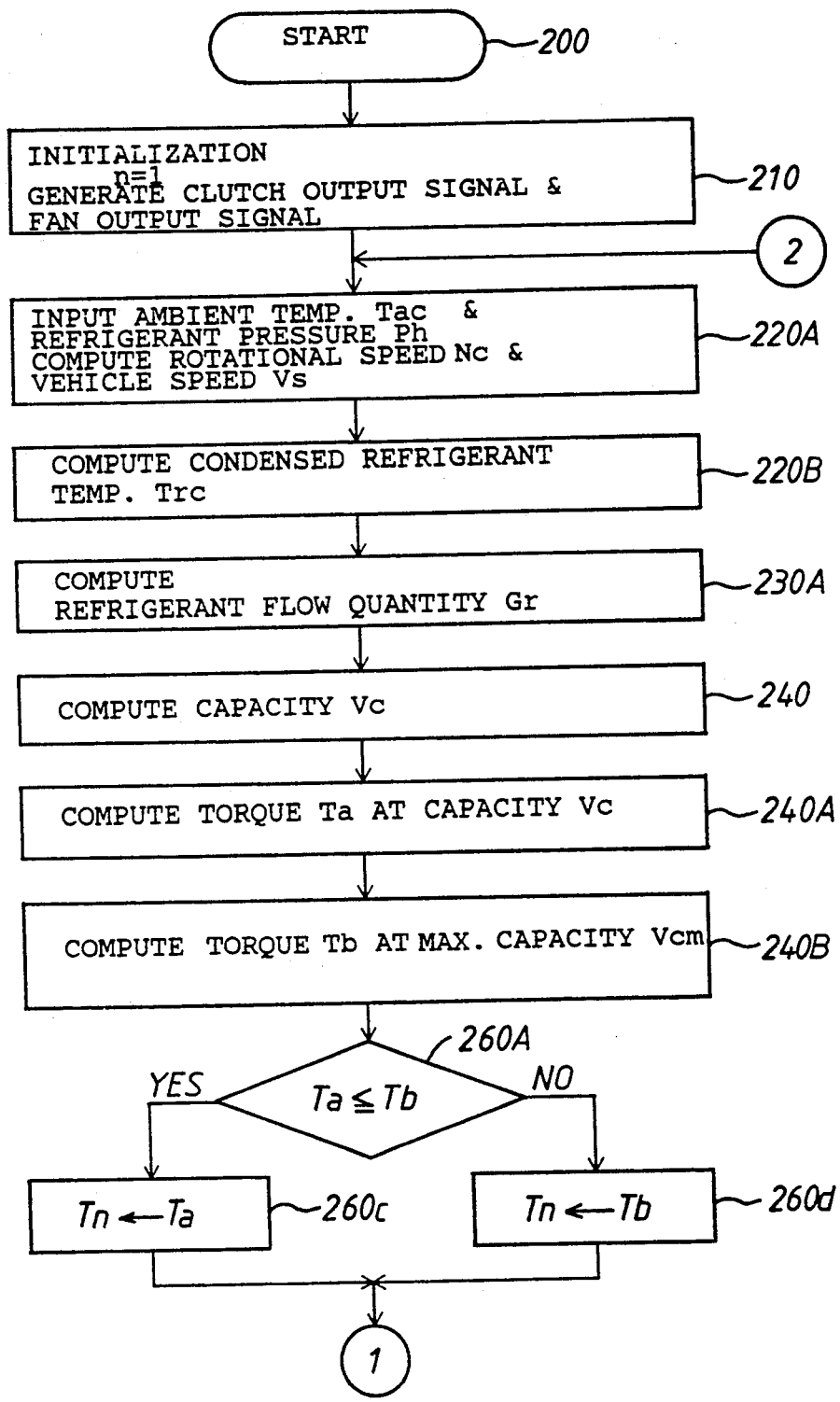
FIG. 15 presents an essential flow chart illustrating operation of the microcomputer according to a fourth preferred embodiment in accordance with the present invention.

In operation, during start of the engine EG, the microcomputer 130 executes the fourth computer program in accordance with the flow chart shown in FIGS. 15 and 3. Then, a variable n is set to "1" at the initialization in step 210 and the electromagnetic clutch 30 is engaged in response to generation of a clutch output signal, as described in the second preferred embodiment. Consequently, the transmission torque from the engine EG is transmitted via the belt mechanism 30a and electromagnetic clutch 30 to the compressor 20 to drive the compressor 20. The cooling fan 50a functions in the same manner as does in the second embodiment. As a result, the evaporator 40 cools an air flow to be supplied into the vehicle compartment.

Then, in substantially the same manner as done in the second embodiment, the microcomputer 130 advances the fourth computer program to and after step 220A and judges "YES" in step 270 if the engine EG is currently idling, and in turn advances the computer program to and after step 270a to execute the associated arithmetic operations. Thereafter, the same processes are repeated every time the decision in step 270 becomes "YES" to control the rotational speeds of the engine EG and the compressor 20 toward the desired rotational speed Nco. In this instance, the rotational speed of the compressor 20 is also controlled so as to smoothly approach the desired rotational speed Nco.

When the accelerator pedal is deoressed in the above idling condition to start the vehicle, the microcomputer 130 judges "NO" in step 270 (see FIG. 3) and performs the arithmetic operations in steps 270b and 270c to acquire a torque difference ΔT and a driving voltage Vn as described in the second embodiment. As the contents of the computations in steps 220B to 260c (or 260d) are utilized in computing those two values, this will be explained below. When a condensed refrigerant temperature Trc, a refrigerant flow quantity Gr and a capacity Vc are computed in the respective steps 220B, 230A and 240 as described in the second embodiment, the microcomputer 130 computes torque Ta for the compressor 20 in step 240A on a basis of the equation (4) in accordance with the capacity Vc computed in step 240 and the high-pressure side refrigerant pressure Ph acquired in step 220A. The microcomputer 130 then computes torque Tb for the compressor 20 based on the equation (5) in step 240B in the same manner as done for the torque Ta.

When both the torques Ta and Tb are computed in this manner, the microcomputer 130 compares them with each other in step 260A. In this case, when the driving torque Ta in the variable capacity range is equal to or less than the torque Tb related to the maximum capacity Vcm, the microcomputer 130 judges "YES" in step 260A and sets the torque Ta as the torque Tn in step 260c. When the torque Tb is smaller than the torque Ta, the microcomputer 130 judges "NO" in step 260A and sets the torque Tb as the torque Tn in step 260d.

The reason for computing the torque Ta in the variable capacity range and the torque Tb related to the maximum capacity respectively in steps 240A and 240B and also for using the smaller one of the torque Ta and Tb as the torque Tn through steps 260A, 240B and 260c (or 260d) is to correctly compute the torque Tn after the capacity of the compressor 20 reaches the maximum capacity Vcm as much as possible. In other words, after the capacity of the compressor 20 reaches the maximum capacity Vcm, the torque Tn for the compressor 20 varies as indicated by the broken line in FIG. 16 with an increase in the heat load on the compressor 20 due to a change in the low-pressure side refrigerant pressure Ps to 3 to 5 Kg/cm$^2$. Therefore, the torque Tn is computed as a value varying as indicated by the solid line in FIG. 16 in a simple computation taking the low-pressure side refrigerant pressure Ps as a fixed value so that the curve of the torque Tn is approximated closer to the one for the variable refrigerant pressure Ps.

After computed the torque Tn as previously described, the microcomputer 130 advances the fourth computer program to and after step 270 to execute substantially the same arithmetic operations as done in the second embodiment. In this case, the engine EG is maintained in the normal running state, as mentioned above. Thus, the microcomputer 130 judges "NO" in step 270 to execute the arithmetic operations in steps 270b and 270c. In the execution in step 270b, a torque difference $\Delta T$ ($= Tn - Tn-1$) is computed based on the driving torque Tn and Tn−1 computed in the current and previous circulating processing respectively. In the next step 270c, a new driving voltage Vn is computed on a basis of the equation (15) in accordance with the driving voltage Vn−1 computed in the previous processing and the computed torque difference $\Delta T$.

After computed the driving voltage Vn in step 270c, the microcomputer 130 generates the driving voltage Vn as an opening degree output signal in step 290 to control the actual opening degree of the idling regulator valve 10b in proportion to the driving voltage Vn. In this instance, with the above mentioned processing in steps 270b, 270c, a change in the currently computed torque Tn to the previously computed torque Tn−1 is computed as the torque difference $\Delta T$, and a value ($a \times \Delta T$) proportional to the torque difference $\Delta T$ is added to the previously computed driving voltage Vn−1 to sequentially update the driving voltage Vn. Thus, the opening degree of the idling regulator valve 10b is set to a value required to yield the current torque Tn, even when the engine EG is maintained in the normal running state. In addition, the adjustment in the opening degree of the idling regulator valve 10b does not directly affect the rotational speed and output of the engine EG, because the throttle valve 10a is maintained in its opening.

When the accelerator pedal is released in the above normal running state to close the throttle valve 10a, the rotational speed of the engine EG lowers and the engine EG is conditioned in its idling operation. Thus, the microcomputer 130 judges "YES" again in step 270 to repeat execution in steps 270a to 290a. As a result, a quantity of an air flow sucked through the bypass passage 10b into the engine EG and a quantity of air-fuel mixture sucked into the engine EG becomes proportional to the driving voltage Vn computed in step 270a or 280b. In this case, the driving voltage Vn−1 which has been computed in step 270c under the normal running operation of the engine EG is used as an initial value in computation of the equation (14), differently from the start timing of the engine, to update the driving voltage Vn taking account of a deviation En between the desired rotational speed Nco and the detected rotational speed Nc.

With this fourth preferred embodiment, immediately after the engine EG is conditioned in its idling operation, the quantities of the air flow and air-fuel mixture supplied to the engine EG are controlled in accordance with the driving torque Tn−1 of the compressor 20 which has been obtained under the normal running operation of the engine EG. As a result, even when the status of the engine EG changes from the normal running state to the idling state and the cooling ability of the refrigeration circuit Rc in the normal running state is in any level, the necessary and sufficient quantities of the air flow and air-fuel mixture will be supplied to the engine EG to properly maintain the idling operation of the engine EG without rough idling, stalling, or rotating at an extremely high rotational speed regardlessly of fluctuation of load acting on the refrigerant circuit.

Figure 16:
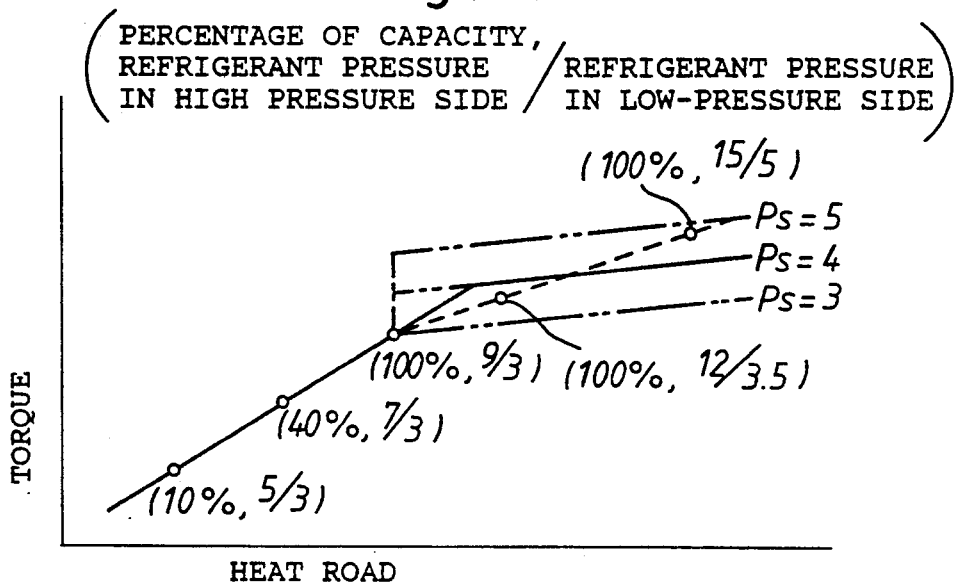
FIG. 16 is a graph showing thermal load vs. torque for the variable capacity type compressor in the fourth preferred embodiment.

In this case, the driving torque for the compressor 20 in the normal running state of the engine may be computed using physical quantities which are relatively easily detectable ones such as the temperature Tac of the outside air flowing into the condenser 50, the rotational speed Nc of the compressor 20, the high-pressure side refrigerant pressure Ph and the vehicle speed Vs. Thus, the driving torque Ta and Tb of the compressor 20 can be detected with a simple construction to thereby control the quantity of the air-fuel mixture to the engine EG under the idling state. Furthermore, in the region where the capacity Vc of the compressor 20 reaches the maximum capacity Vcm and the low-pressure side refrigerant pressure Ps varies, the torque which actually varies as indicated by the broken line in FIG. 16 is approximated as indicated by the solid line in FIG. 16 through the computation of the equation (5) using the middle value of the varying range as the refrigerant pressure Ps. Thus, the torque Tb can be computed precisely. Furthermore, the final torque Tn is determined with a smaller one of the computed torque Ta before the capacity of the compressor 20 reaches the maximum capacity Vcm and the computed torque Tb after the capacity of the compressor 20 reaches the maximum capacity Vcm. Thus, this torque Tn can be treated as the continuously varying one. The other operation and function are the same as those of the second embodiment.

A fifth preferred embodiment in accordance with the present invention will now be described. The fifth preferred embodiment is characterized in that the same electric circuit structure as the one described in the third preferred embodiment (see FIGS. 1 and 9) is adopted and that a computer program (hereinafter called as "a fifth computer program") which is specified by a modified flow chart portion shown in FIG. 17 replacing the flow chart portion in FIG. 2 described in the first embodiment and the flow chart portion of FIG. 3 is previously stored into the ROM of the microcomputer 130, instead of the computer programs described in the first and third embodiments. The other construction is substantially the same as that of the first embodiment.

Figure 18:
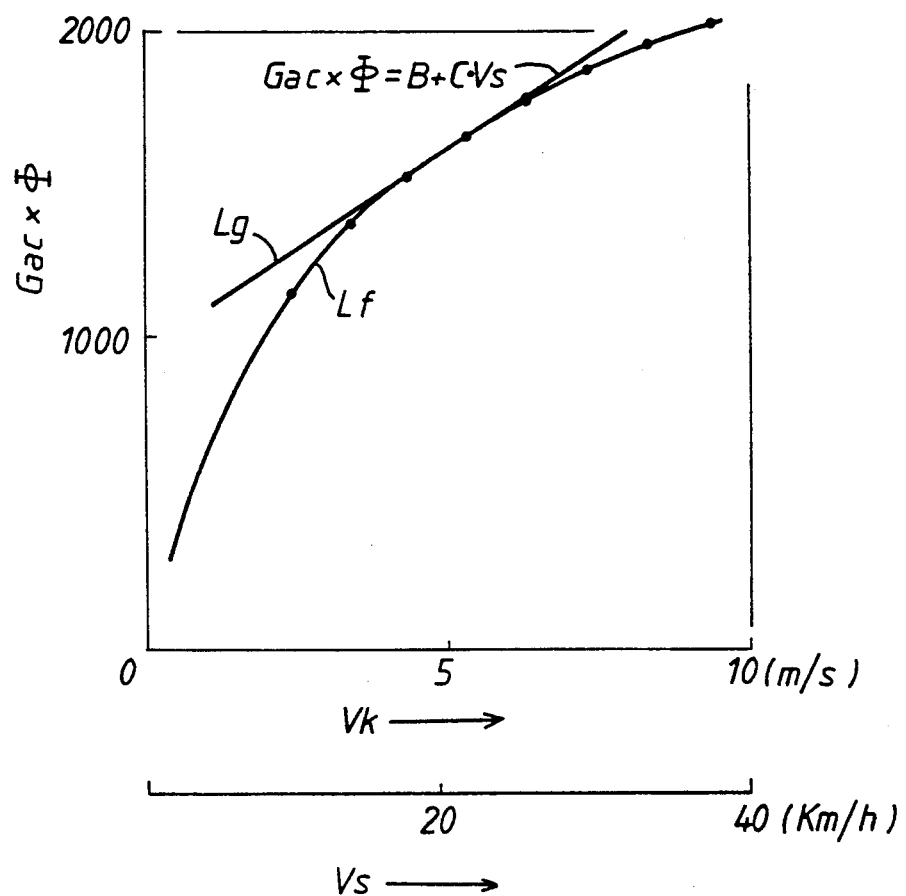
FIG. 18 is a graph showing the relationship between Gac×Φ and a velocity Vk of an air flow from the outside and a speed Vs of the vehicle in the fifth embodiment.

In this embodiment, the present inventors made it possible to determine torque for the compressor 20 reflecting both the high-pressure side refrigerant pressure and capacity of the compressor 20 on a basis of the following. It is to be noted that the equations (1) to (10) are the same as in the first embodiment. In consideration that a velocity of the outside air flow corresponds to a speed of the vehicle, Gac·Φ is specified by a curve Lf as shown in FIG. 18 in association with a velocity of the outside air flow Vk(m/s) on the surface (or front side) of the condenser 50, i.e., a speed Vs of the vehicle. Approximation of the curve Lf by a straight line Lg thus yields the following equation (22).

$$Gac \times \Phi = B + C \times Vs \tag{22}$$

This equation (22) is the same as the equation (18) in the second embodiment. The equation (6) is therefore rewritten as the following equation (23).

$$Qac = A(B + C \times Vs)(Trc - Tac) \tag{23}$$

This equation (23) is the same as the equation (19) in the second embodiment.

Based on the above premise, Qrc=Qac is satisfied, as a quantity of radiated heat Qrc from the condensed refrigerant in the condenser 50 is radiated to the air side. Thus, the following equation (24) can be derived from the equations (3) and (23).

$$Gr = A(B + C \times Vs)(Trc - Tac)/(D - E \times Trc) \tag{24}$$

This equation (24) is the same as the equation (17) in the second embodiment. From the above, it is apparent that the torque T can be determined in the above conditions.

The present inventors have confirmed that computation of the torque for the compressor 20 should be delayed with respect to a vehicle speed Vs for the following reason. If the equation (22) is specified in association with the vehicle speed Vs as mentioned above, a refrigerant flow quantity Gr, a pump-out capacity Vc and torque T appear to change simultaneously in the individual equations (24), (2) and (6), when the vehicle speed Vs varies. In other words, for computing a refrigerant flow quantity Gr, the torque is computed on the assumption that the quantity of radiated heat Qrc from the condensed refrigerant in the condenser 50 can be known on the premise that the quantity of radiated heat Qrc is equal to the quantity of radiated heat Qac from the air side of the condenser 50.

In principle, however, this is satisfied when the compressor 20 is maintained in a steady state, and is not satisfied in a transitional state. Actually, it is observed that a change in the high-pressure side refrigerant pressure Ph or in the torque T is delayed from a change in the vehicle speed Vs or in a quantity of entering air Gac due to the heat capacity or the like of the condenser 50. In the transitional state, the sum of the quantity of radiated heat Qac and a change in the heat capacity of the heat-exchanging portion of the condenser 50 is equal to the quantity of radiated heat Qrc. That is, Qrc=Qac will not be satisfied until the change in the heat capacity of the heat-exchanging portion of the condenser 50 decreases down to zero with elapsing time based on a certain delay system.

Unless this delay is cleared in a transitional state, therefore, the above-described torque computation may not be carried out accurately. As the vehicle speed Vs can be known, it is possible to know the quantity of radiated heat Qac. In such a transitional state, therefore, Qrc can be predicted from Qac by delaying a change in the vehicle speed Vs with a predetermined time constant. The refrigerant flow quantity Gr or the torque can therefore be known from the estimated value.

In this respect, the present inventors have given a delay to the vehicle speed Vs by the predetermined time constant in advance to accurately predict the refrigerant flow quantity Gr, thus preventing the precision of the torque computation from transitionally dropping due to the heat capacity or the like of the condenser 50. It is to be noted that the predetermined time constant is selected to be the time required for the high-pressure side refrigerant pressure Ph to reach a value of this pressure Ph on the assumption that there is no delay in variation of the pressure Ph.

Figure 17:
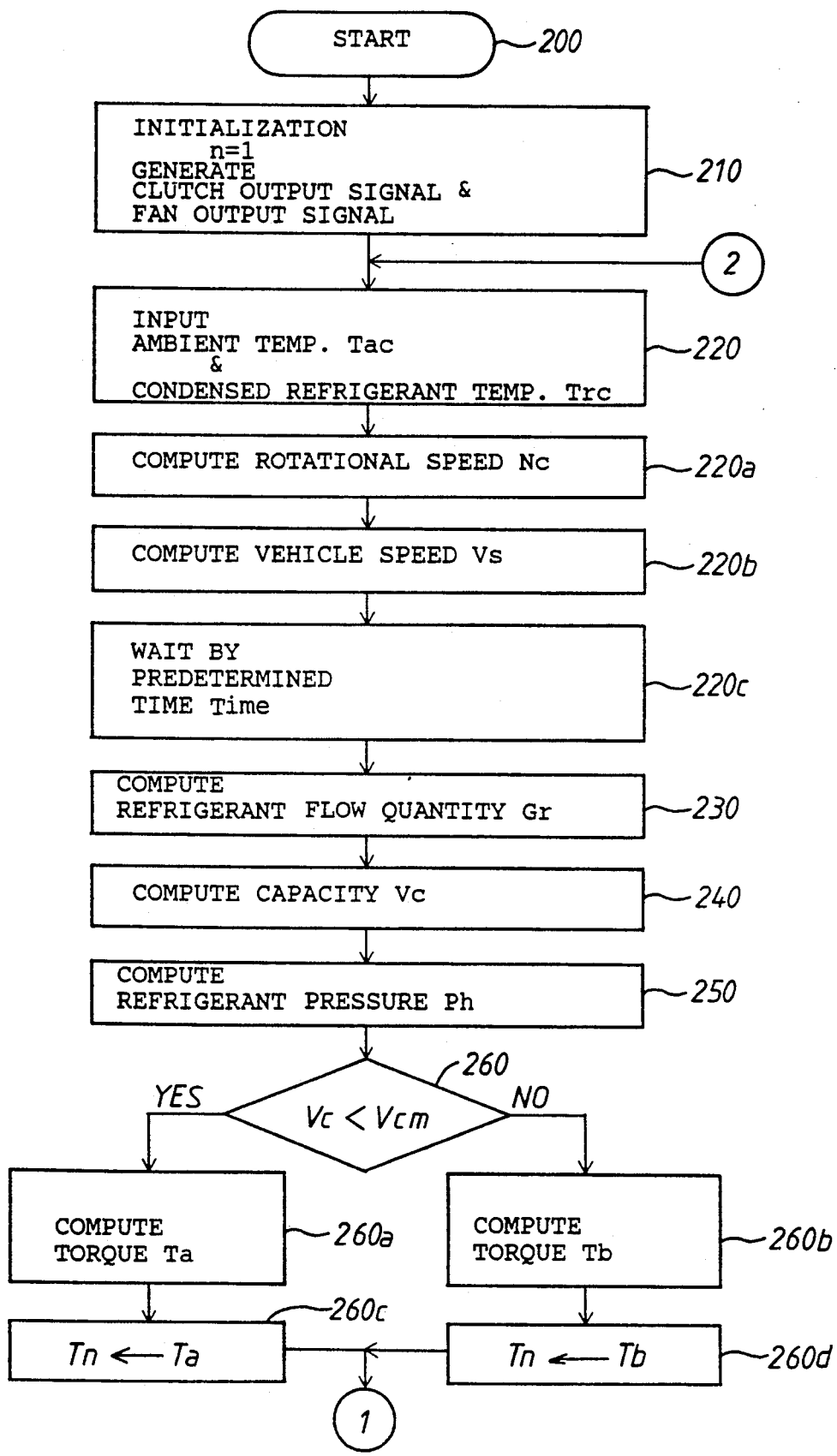
FIG. 17 presents an essential flow chart illustrating operation of the microcomputer in a fifth preferred embodiment.

In operation, under start of the engine EG, the microcomputer 130 starts execution of the fifth computer program in step 200 in accordance with the flow chart shown in FIGS. 17 and 3. Then, the microcomputer 130 executes the initialization in step 210 to set a variable n to "1" and generates a clutch output signal and a fan output signal. Consequently, as described in the first embodiment, the compressor 20 is driven with power supplied from the engine EG via the belt mechanism 30a and the electromagnetic clutch 30 engaged in response to the clutch output signal, and the cooling fan 50a is driven by the driving circuit 160 in response to the fan output signal. In the refrigeration circuit Rc, the compressor 20 takes in and compresses refrigerant from the pipe P1 in accordance with the actual capacity and discharges it as high-temperature and high-pressure compressed refrigerant into the pipe P2. Then, the condenser 50 condenses the compressed refrigerant from the pipe P2 under the cooling effect of the cooling fan 50a and supplies it as condensed refrigerant into the pipe P3, and the receiver 60 applies a liquid phase component of the condensed refrigerant from the pipe P3 as circulating refrigerant into the pipe P4. Subsequently, the expansion valve 70 expands the refrigerant from the pipe P4 in accordance with the temperature of the refrigerant in the pipe P1 and supplies it into the evaporator 40 via the pipe p5. Thus, the evaporator 40 cools an intake air flow in accordance with the evaporating effect of the supplied refrigerant.

After performed the arithmetic operation in step 210, the microcomputer 130 receives the ambient temperature Tac and condensed refrigerant temperature Trc from the A-D converter 120 in step 220, computes a rotational speed Nc of the compressor 20 according to individual rotational speed pulses from the waveform shaper 110 in step 220a, and then computes the actual vehicle speed Vs according to individual shaped vehicle speed pulses from the waveform shaper 110a in step 220b. Thereafter, the microcomputer 130 waits by a predetermined time Time in the next step 220c. This predetermined time Time corresponds to the predetermined time constant mentioned above and is previously stored in the ROM of the microcomputer 130.

When the wait time in step 220c elapses, the microcomputer 130 computes a refrigerant flow quantity Gr(kg/hour) in step 230 on a basis of the equation (24) in accordance with the ambient temperature Tac and condensed refrigerant temperature Trc acquired in step 220 and the vehicle speed Vs acquired in step 220b. The microcomputer 130 then computes a pump-out capacity Vc(cc) of the compressor 20 in step 240 on a basis of the equation (2) according to the computed refrigerant flow quantity Gr and the rotational speed Nc acquired in step 220a and computes high-pressure side refrigerant pressure Ph on a basis of the equation (3) according to the condensed refrigerant temperature Trc acquired in step 220.

Then, the microcomputer 130 advances the fifth computer program to and after the step 260 where it compares the computed pump-out capacity Vc with the maximum pump-out capacity Vcm of the compressor 20. Based on the results of the comparison, the microcomputer 130 executes the arithmetic operations either in steps 260a and 260c or in steps 260b and 260d as described in the first embodiment to determine driving torque Tn. When the vehicle is running at this time, the microcomputer 130 judges "NO" in step 270 and determines a torque difference $\Delta T$ (=Tn−Tn−1) in step 270b and computes a driving voltage Vn in step 270c.

In step 290, the microcomputer 130 generates the driving voltage Vn obtained in step 270c as an opening degree output signal, in response to which the driving circuit 140 opens the idling regulator valve 10b by a desired opening degree corresponding to the driving voltage Vn. Consequently, an amount of bypassing air flowing from the upstream of the throttle valve 10a to the downstream through the bypass passage 10c is adjusted by the desired opening of the idling regulator valve 10b. At this time, the flow quantity of the air through the throttle valve 10a in the suction passage 10 is controlled in accordance with a depression amount of the throttle valve 10b. After the arithmetic operation in step 290 is executed, the microcomputer 130 updates n as n=n+1 in step 290a, then returning the computer program to step 220.

In the state where the decision in step 270 in the computer program is repeatedly "NO" during the above-mentioned running state of the vehicle, torque Ta or torque Tb, i.e., driving torque Tn will be repeatedly computed based on computations of the refrigerant flow rate Gr, capacity Vc and high-pressure side refrigerant pressure Ph as described above. In this case, after waiting by the predetermined time Time after computed the vehicle speed Vs in step 220b, the microcomputer 130 computes the refrigerant flow quantity Gr, capacity Vc, high-pressure side refrigerant pressure Ph and torque Ta or Tb. Then, the microcomputer 130 repeatedly computes a difference between the previous value of the computed torque Ta (or torque Tb) and the latest value thereof as a torque difference $\Delta T$ in step 270b, repeatedly computes a driving voltage Vn in step 270c on a basis of the equation (15) in accordance with the driving voltage Vn−1 and the torque difference $\Delta T$ to generates the driving voltage Vn as an opening degree output signal in step 290. When Vc<Vcm is satisfied, it is easily understood from the equation (15) that Ta is determined so as to vary in proportion to a change in Vc. In other words, the driving voltage Vn is repeatedly determined based on the equation (15) according to the latest torque difference $\Delta T$.

When the vehicle is stopped in the above condition to make the engine EG idling, the microcomputer 130 judges "YES" in step 270 based on the current rotational speed Nc acquired in step 220a. The microcomputer 130 then performs the same arithmetic operation as done in the first embodiment in steps 270a to 290a. Consequently, an amount of bypassing air flowing through the bypass passage 10c from the upstream of the throttle valve 10a is adjusted in accordance with the opening degree of the idling regulator valve 10b, thereby keeping the engine EG idling.

As described above, when the vehicle is started, the execution of the fifth computer program is repeated under repetitive decisions "NO" in step 270. In other words, during repetitive execution of the fifth computer program, repeated are computation of the refrigerant flow quantity Gr based on the equation (24), computation of the capacity Vc based on the equation (2) and computation of the high-pressure side refrigerant pressure Ph based on the equation (3) in steps 230 to 250. And computation of the torque Ta (or torque Tb) based on the equation (4) (or (5)) in step 260a (or step 260b) is repeated as the judgment in step 260 is repeatedly made.

Thus, the torque Ta in step 260a (or the torque Tb in step 260b) is accurately computed based not only on the high-pressure side refrigerant pressure Ph but also on a change in the capacity Vc of the compressor 20. As a result, the accurate torque computation is easily accomplished and no special volume sensor or torque sensor is required to detect the capacity and torque of the compressor 20. In this case, the refrigerant flow quantity Gr, capacity Vc, high-pressure side refrigerant pressure Ph and torque Ta or torque Tb are computed upon elapse of the predetermined time Time after the vehicle speed Vs has been computed in step 220b. Thus, the point of the torque computation matches the delay of a change in the high-pressure side refrigerant pressure Ph due to the heat capacity or the like of the condenser 50, thus ensuring high precision in computation of the torque of the compressor 20.

Furthermore, the driving voltage Vn is repeatedly computed in accordance with the torque set in step 260c or 260d. Thus, the driving voltage Vn is computed in step 280b on a basis of the driving voltage Vn−1 computed immediately before the affirmative "YES" decision in step 270 (i.e., the driving voltage Vn computed in step 270c), when the engine EG is again conditioned in its idling state. This driving voltage Vn is generated as an opening degree output signal in step 290 to control an opening degree of the idling regulator valve 10b. Accordingly, the rotational speed in the re-idling state of the engine EG can always be kept accurately and properly within the proper torque range.

In other words, even when the capacity of the compressor 20 increases due to an increase of the load acting on the air conditioner during the aforementioned running of the vehicle, this increase in the capacity or an increase in torque and an increase in the driving voltage Vn are repeatedly computed in step 260a (or 260b) and step 270c. When the engine EG is again conditioned in its idling state later, the current driving voltage Vn is computed using the previous increased driving voltage in step 280b and is generated as an opening degree output signal in step 290. As a result, the opening degree of the idling regulator valve 10b is controlled in accordance with the driving voltage Vn matching the increased load acting on the air conditioner or the increased torque of the compressor 20.

Even when the engine EG is set idling again as described above, therefore, the output of the engine EG can be secured by the increased torque of the compressor 20 or the increased flow quantity of the bypassing air through the idling regulator valve 10b immediately before that status change. Thus, the re-idling status of the engine EG can be smoothly maintained without dropping the rotational speed. Since the torque computation is performed with a delay by the aforementioned time constant to the vehicle speed Vs as described above, the idling status of the engine can always be kept properly with the accurate torque regardless of the heat capacity or the like of the condenser 50.

In the case where when the vehicle is conditioned in its idling state prior to start thereof, the microcomputer 130 advances the computer program to and after step 270a without judging "NO" in step 270, the microcomputer 130 initially sets (Nco−Nc) as a deviation E1 in step 270a, judges "YES" in step 280, sets V0=V00 as well as E0=E1=0 in step 280a, and performs an arithmetic operation in step 280b. The processing in step 280a is an initialization to properly execute an initial arithmetic operation in step 280b. The other operation and effect are the same as those of the first embodiment.

Figure 19:
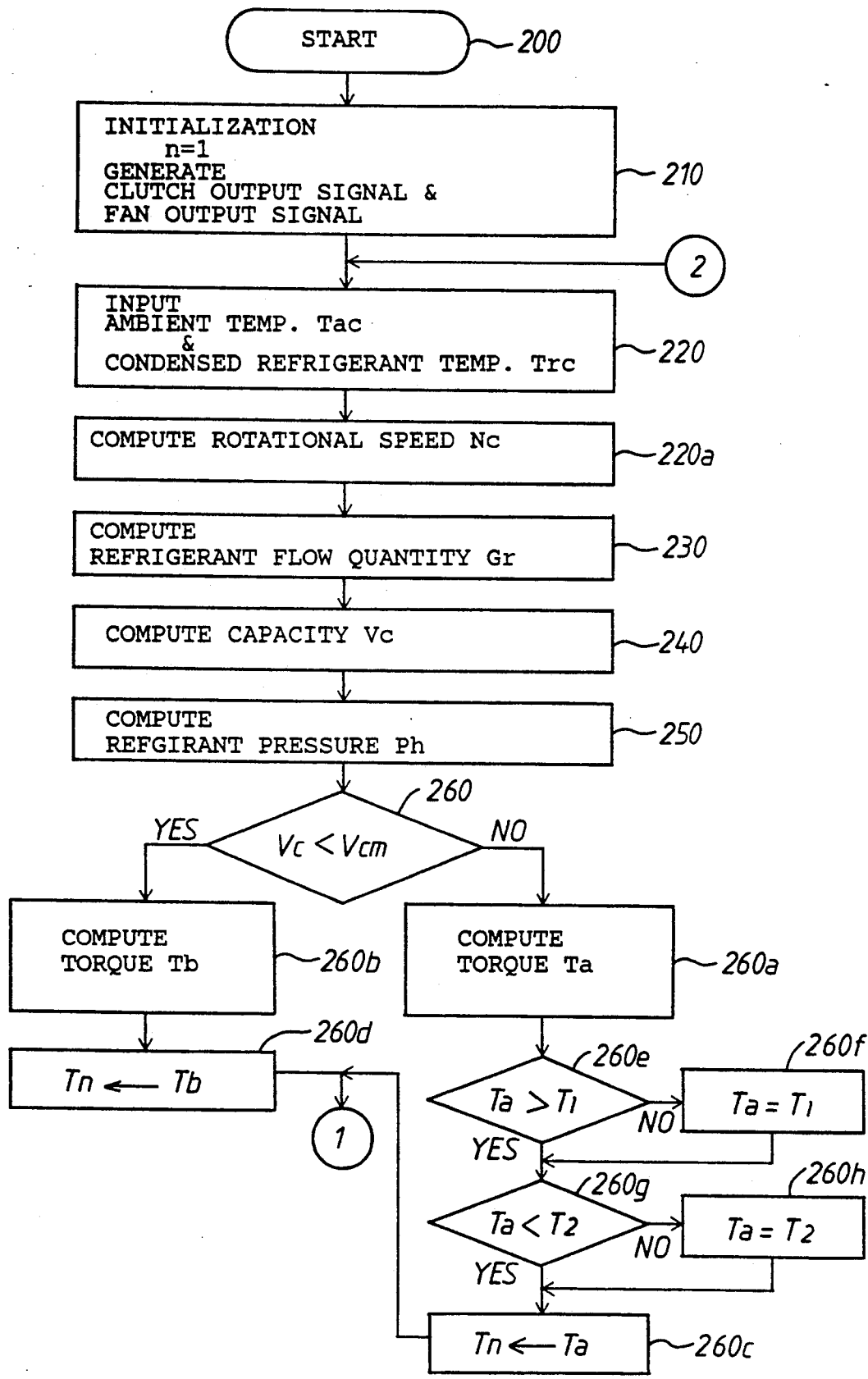
FIG. 19 presents an essential flow chart illustrating operation of the microcomputer in a sixth preferred embodiment.

A sixth preferred embodiment in accordance with the present invention will now be described. The sixth preferred embodiment is characterized in that a modified flow chart portion shown in FIG. 19 is adopted in place of the flow chart portion of FIG. 2 described in the first preferred embodiment and that a computer program (hereinafter called as "a sixth computer program") which is specified by the modified flow chart portion of FIG. 19 and the flow chart portion of FIG. 3 is previously stored into the ROM of the microcomputer 130, instead of the computer program described in the first embodiment. The other construction is substantially the same as that of the first embodiment.

In operation, if the computed pump-out capacity Vc is smaller than the maximum pump-out capacity Vcm of the compressor 20 when the sixth computer program (see FIGS. 19 and 3) proceeds to step 260 as described in the first embodiment, the microcomputer 130 judges "YES" in step 260 and computes torque Ta for the compressor 20 in step 260a on a basis of the equation (4) in accordance with the high-pressure side refrigerant pressure Ph acquired in step 250. When Vc is equal to or greater than Vcm, the microcomputer 130 judges "NO" in step 260 and computes torque Tb for the compressor 20 in step 260b on a basis of the equation (5) in accordance with the high-pressure side refrigerant pressure Ph obtained in step 250.

When completed the arithmetic operation in step 260a as previously described, the microcomputer 130 performs arithmetic operations necessary for restricting the torque Ta obtained in step 260a within a predetermined allowable torque range in association with the following equations (25) and (26) in steps 260e to 260h. More specifically, the microcomputer 130 computes lower limit torque T1 in step 260e on a basis of the equation (25) in accordance with the high-pressure side refrigerant pressure Ph obtained in step 250 and then compares the torque Ta obtained in step 260a with the lower limit torque T1.

$$T1 = Ka \times Ph + Kb \quad (25)$$

$$T2 = Kc \times Ph + Kd \quad (26)$$

It is to be noted that Ka and Kb in the equation (25) and Kc and Kd in the equation (26) are all constants. When the torque Ta is currently equal to or smaller than the lower limit torque T1, the microcomputer 130 judges "NO" in step 260e, sets the torque T1 attained in step 260e as the torque Ta in the next step 260f, and then advances the sixth computer program to step 260g. When the torque Ta is greater than the lower limit torque T1, the microcomputer 130 judges "YES" in step 260e and advances the sixth computer program to step 260g.

When the sixth computer program proceeds to step 260g from step 260e or step 260f, the microcomputer 130 computes upper limit torque T2 on a basis of the equation (26) in accordance with the high-pressure side refrigerant pressure Ph obtained in step 250 and then compares the torque Ta obtained in step 260a with the upper limit torque T2. When the torque Ta is currently equal to or greater than the upper limit torque T1, the microcomputer 130 judges "NO" in step 260g, sets the upper limit torque T2 obtained in step 260g into the torque Ta in the next step 260f to advance the sixth computer program to step 260c. When the torque Ta is smaller than the upper limit torque T2, the microcomputer 130 judges "YES" in step 260g to advance the sixth computer program to step 260c.

When the sixth computer program proceeds to step 260c from step 260g or step 260h, the microcomputer 130 sets the torque Ta obtained in step 260f or step 260h as Tn. When completed the arithmetic operation in step 260b as previously described, the microcomputer 130 sets the torque Tb obtained in step 260b into Tn in step 260d.

The reason for limiting the torque obtained in step 260a within the predetermined torque allowable range in association with the equations (25) and (26) will now be explained. As the premise for this, the present inventors have confirmed that a width in fluctuation of torque for the compressor 20 related to high-pressure side refrigerant pressure may be estimated on a basis of the fact that the torque for the compressor 20 changes nearly in proportion to the high-pressure side refrigerant pressure and varies in accordance with a change in the capacity of the compressor 20 as described previously.

In the aforementioned equations (4) and (5), each of the torque Ta and Tb varies along lines Lh and Li shown in FIG. 20 in accordance with changes of the high-pressure side refrigerant pressure Ph. It is estimated that a proper changing range of the torque Ta according to a change in the high-pressure side refrigerant pressure Ph normally corresponds to a range surrounded by a line Lh1 specified by the equation (25) and lines Lh2 and Li specified by the equation (26).

In this respect, this range is defined as the aforementioned predetermined torque allowable range. When the torque Ta obtained in step 260a is maintained in a value outside the torque allowable range due to some disturbance or the like, the torque Ta is limited in the torque allowable range. It is prevented that torque for the compressor 20 which is not considered present under the idling operation of the engine EG is determined as an abnormal value. This may realize the fail-safe measure of the present apparatus against disturbance or malfunction of the microcomputer 130. Both of the equations (25) and (26) are previously stored in the ROM of the microcomputer 130.

If the engine EG is maintained idling when completed the arithmetic operation in step 260c or step 260d, the microcomputer 130 judges "YES" in step 270 as described in the first embodiment and then performs the arithmetic operations in steps 270a to 290a as described above. Thus, a quantity of bypassing air flowing through the bypass passage 10c from the upstream of the throttle valve 10a to the downstream is adjusted in accordance with a desired opening degree of the idling regulator valve 10b to maintain the engine EG idling.

When the accelerator pedal is depressed with the engine EG idling to start the vehicle, the microcomputer 130 determines "NO" in step 270 based on the normal running state of the engine EG and advances the sixth computer program to and after step 270b to compute and set a torque difference $\Delta T$ ($= Tn - Tn-1$) and to compute a driving voltage Vn so as to produce it as an opening degree output signal. As a result, an amount of bypassing air flowing through the bypass passage 10c from the upstream of the throttle valve 10a to the downstream is adjusted in accordance with a desired opening degree of the idling regulator valve 10b. At this time, a quantity of air flowing through the throttle valve 10a is adjusted in accordance with a depression degree of the throttle valve 10a.

In the case where execution of the arithmetic operations results in repetitive judgment of "NO" in step 270 during the running state of the vehicle, the microcomputer 130 repeats computation of a refrigerant flow quantity Gr based on the equation (1), computation of a capacity Vc based on the equation (2) and computation of high-pressure side refrigerant pressure Ph based on the equation (3). The microcomputer 130 further repeats computation of torque Ta (or torque Tb) based on the equation (4) (or (5)) in step 260a (or step 260b) as judgment in step 260 is repeated. In this case, torque Ta is restricted in the aforementioned torque allowable range or a value between torque T1 and torque T2 dependent on the high-pressure side refrigerant pressure Ph through the arithmetic operations in steps 260e to 260h.

The microcomputer 130 then repeatedly computes a difference between the previous and latest torques Ta (or Tb) as a torque difference $\Delta T$ in step 270b, repeatedly computes a driving voltage Vn based on the equation (15) according to the driving voltage Vn−1 and the torque difference $\Delta T$ in step 270c to generate the driving voltage Vn as an opening degree output signal in step 290.

When the vehicle is stopped in the above condition to set the engine EG idling, the microcomputer 130 judges "YES" in step 270 based on the current rotational speed Nc acquired in step 220a. Then, the microcomputer 130 performs the arithmetic operations in and after step 270a as described in the first embodiment to thereby adjust the actual opening degree of the idling regulator valve 10b in accordance with the driving voltage Vn obtained in step 290. This means that the idling regulator valve 10b maintains the engine EG idling with the current adjusted opening degree.

As described above, when the vehicle is started at the engine idling state, the decision in step 270 changes from "YES" to "NO" and execution of the sixth computer program will be repeated under repetitive decision of "NO" in step 270. In other words, during the repetitive execution of the sixth computer program, computation of the refrigerant flow quantity Gr, computation of the capacity Vc and computation of the high-pressure side refrigerant pressure Ph are repeated in steps 230 to 250, and computation of the torque Ta (or torque Tb) in step 260a (or step 260b) is repeated as the judgment in step 260 is repeated. The torque Ta is repeatedly set within the aforementioned torque allowable range on a basis of the equations (25), (26) in steps 260e to 260h for every computation of the torque Ta in step 260a.

Thus, the torque Ta in step 260a (or the torque Tb in step 260b) is accurately computed based not only on the high-pressure side refrigerant pressure Ph but also on a change in the capacity Vc of the compressor 20. As a result, the accurate torque computation may be easily accomplished and no special capacity sensor or torque sensor is required for detecting the capacity and torque of the compressor 20. When the torque Ta obtained in step 260a is not maintained between the torque T1 and torque T2, it is restricted in a value between the torque T1 and torque T2. Thus, torque for the compressor 20 will not become an abnormal value which is not normally predicted.

Furthermore, the driving voltage Vn is repeatedly computed in accordance with the torque set in step 260c or 260d. Thus, the driving voltage Vn is computed in step 280b based on the driving voltage Vn−1 computed immediately before the affirmative "YES" decision in step 270 (i.e., based on the driving voltage Vn computed in step 270c) when the engine EG is conditioned again in idling. This driving voltage Vn is then generated as an opening degree output signal in step 290 to adjust a desired opening degree of the idling regulator valve 10b. Accordingly, the rotational speed in the re-idling state of the engine EG can always be maintained accurately and properly within the proper torque range.

In other words, even when the capacity of the compressor 20 increases due to an increase of load acting on the air conditioner during the aforementioned running of the vehicle, an increase in the capacity or increases in the torque and driving voltage Vn are repeatedly computed in step 260a (or 260b) and step 270c. When the engine EG is conditioned in its idling state again later, the current driving voltage Vn is computed using the previous increased driving voltage in step 280b and is generated as an opening degree output signal in step 290. Thus, the opening degree of the idling regulator valve 10b is controlled in accordance with the driving voltage Vn matching the increased load acting on the air conditioner or the increased torque for the compressor 20.

Therefore, output of the engine EG can be secured by the increased torque for the compressor 20 or the increased quantity of bypassing air flowing through the idling regulator valve 10b immediately before that status change, even when the engine EG is again conditioned in its idling state as previously described. As a result, the re-idling status of the engine EG can be smoothly maintained without dropping the rotational speed. Since the torque Ta will not be maintained in a value outside the aforementioned torque allowable range as previously described, the idling state of the engine can always be kept well with the failsafe effect of the present apparatus maintained, regardless of disturbance or a malfunction of the microcomputer 130. The other operation and effect are the same as those of the first embodiment.

Figure 21:
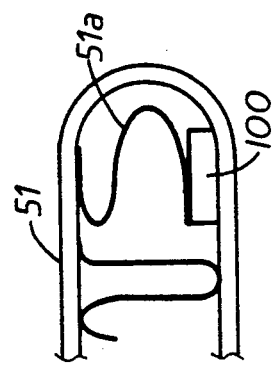
FIG. 21 illustrates a view of a refrigerant temperature sensor attached to a condensing pipe of a condenser.

For the actual practice of the present invention, the refrigerant temperature sensor 100 adopted in the above-described individual embodiments may supportably be pressed on a bent portion of a condensing pipe 51 of the condenser 50 by means of a leaf spring 51a as shown in FIG. 21.

What is claimed is:

1. A method for controlling a parameter of a prime mover that drives a variable capacity type compressor provided in a refrigeration circuit to compress and discharge refrigerant to be circulated through a heat exchanger in the refrigeration circuit, the method comprising the steps of:
   calculating a rotational speed of the compressor;
   calculating a quantity of the refrigerant discharged from the compressor and a pressure of the refrigerant circulated in a high-pressure side of the refrigeration circuit;
   calculating a capacity of the compressor, which is operating, based on said calculated quantity of the refrigerant and said calculated rotational speed;
   calculating said torque in accordance with said calculated pressure of the refrigerant and said calculated capacity; and
   using said calculated torque to control an operating parameter of said prime mover.

2. A method for controlling a parameter of a prime mover that drives a variable capacity type compressor provided in a refrigeration circuit of an air conditioner to compress and discharge refrigerant to be circulated through a condenser and an evaporator in the refrigeration circuit, the method comprising the steps of:
   calculating a rotational speed of the compressor;
   calculating a quantity of the refrigerant discharged from the compressor;
   calculating a capacity of the compressor based on said calculated rotational speed and said calculated quantity of the refrigerant;
   calculating pressure of refrigerant circulated in a high-pressure side of the refrigeration circuit;
   calculating said torque in accordance with said calculated pressure of the refrigerant and said calculated capacity; and
   using said calculated torque to control an operating parameter of said prime mover.

3. A method for calculating torque as claimed in claim 1, wherein the refrigeration circuit is a refrigeration circuit of an air conditioner; and wherein the step of calculating a capacity of the compressor is a step of calculating a capacity of the compressor based on a ratio of the calculated quantity of the refrigerant to said calculated rotational speed.

4. A method for calculating torque as claimed in claim 2, wherein the step of calculating the quantity of the refrigerant includes calculating a quantity of the refrigerant in accordance with said calculated rotational speed, an ambient temperature corresponding to a temperature of air flowing into the air conditioner from an outside thereof, and a temperature of condensed refrigerant corresponding to a temperature of the refrigerant in the condenser.

5. A method for calculating torque as claimed in claim 2, wherein the prime mover is an engine for driving an automotive vehicle installed with the air conditioner and having a control valve for controlling an idling operation of the engine; and
   wherein said using step includes a step of using said calculated torque for controlling an opening degree of said control valve.

6. A method for calculating torque as claimed in claim 5, wherein the engine comprises an idling control device provided for determining the opening degree of said control valve and controlling said control valve, said idling control device comprising means for determining whether the engine is maintained in an idling condition thereof;
   wherein the step of calculating said torque includes calculating the torque during non-idling operation of the engine; and
   wherein the step of using said calculated torque controls the opening degree of said control valve based on said calculated torque during non-idling operation of the engine and controls the opening degree of said control valve in accordance with a difference between the calculated rotational speed and a predetermined idling speed of the engine after the engine is actually conditioned in the idling operation.

7. A method for calculating torque as claimed in claim 2, wherein the step of calculating pressure of the refrigerant is to calculate pressure of refrigerant based on a temperature of condensed refrigerant corresponding to a temperature of the refrigerant in the condenser.

8. A method for calculating torque as claimed in claim 5, wherein the step of calculating the quantity of the refrigerant is to calculate based on a speed of the vehicle, an ambient temperature corresponding to a temperature of air flowing into the air conditioner from an outside thereof, and a temperature of condensed refrigerant corresponding to a temperature of the refrigerant in the condenser.

9. An apparatus for controlling an idling speed of an engine which drives a variable capacity type compressor provided in a refrigeration circuit equipped in an automotive vehicle to compress and discharge refrigerant to be circulated through a heat exchanger in the refrigeration circuit, the vehicle having an idling detecting means for detecting an idling operation of the engine, the apparatus comprising:
   means for determining a pressure of the refrigerant discharged from the compressor;
   means for determining a heat-exchanging ability of the heat exchanger;
   means for calculating torque for the compressor necessary for controlling the idling rotational speed of the engine in accordance with said determined discharged pressure and said determined heat-exchanging ability; and
   an idling rotational speed control device for controlling an idling rotational speed of the engine in accordance with the calculated torque in response to a detected result of the idling detecting means.

10. A method as in claim 1, wherein said operating parameter is an opening degree of a control valve which controls an idling operation of the engine.

11. An apparatus for calculating torque for a variable capacity type compressor provided in a refrigeration circuit equipped in an automotive vehicle that has an engine, to compress and discharge refrigerant to be circulated through a condenser and an evaporator in the refrigeration circuit, the apparatus comprising:

ambient temperature detecting means for detecting a temperature of air coming into an inside of the vehicle from outside;

refrigerant temperature detecting means for detecting a temperature of condensed refrigerant in the condenser;

vehicle speed detecting means for detecting a speed of the vehicle;

torque calculation means for calculating torque for the compressor in accordance with said detected ambient temperature of the air, said detected temperature of the condensed refrigerant, said detected speed of the vehicle; and means for controlling a parameter of said engine based on the calculated torque.

12. An apparatus as in claim 11 wherein said parameter of said engine is an opening degree of a control valve for controlling an idling operation of the engine.

13. An apparatus for controlling an idling speed of an engine which drives a variable capacity type compressor provided in a refrigeration circuit equipped in an automotive vehicle to compress and discharge refrigerant to be circulated through a heat exchanger in the refrigeration circuit, the apparatus comprising:

first means for detecting an operative condition value of said refrigeration circuit related to a discharge capacity of the compressor;

second means for detecting a physical value indicative of a pressure of the refrigerant circulated in a high-pressure side of the refrigeration circuit;

calculation means for calculating torque for the compressor based on the detected operative condition value of said refrigeration circuit and the detected physical amount indicative of said pressure; and control means for controlling a parameter of said engine based on the calculated torque.

14. An apparatus as claimed in claim 13, wherein the parameter of said engine is an opening degree of a control valve for controlling an idling operation of said engine.

15. An apparatus as claimed in claim 13, wherein said first means comprises means for detecting at least a physical value indicative of a heat exchange amount of said heat exchanger and a physical value indicative of a rotational speed of the compressor.

16. An apparatus for controlling an idling speed of an engine which drives a variable capacity type compressor provided in a refrigeration circuit equipped in an automotive vehicle to compress and discharge refrigerant to be circulated through a heat exchanger in the refrigeration circuit, the apparatus comprising:

first detecting means for detecting a first physical value indicative of a rotational speed of the compressor;

second detecting means for detecting a second physical value indicative of a pressure of the refrigerant circulated in a high-pressure side of the refrigeration circuit;

third detecting means for detecting a third physical value indicative of a heat exchange amount of said heat exchanger;

first calculation means for applying the detected third physical value to a calculation formula for calculation of the heat exchange amount of said heat exchanger and for calculating a flow quantity of the refrigerant discharged from the compressor;

second calculation means for calculating a discharge capacity of the compressor based on the calculated flow quantity of the refrigerant and the detected first physical value;

third calculation means for calculating torque for the compressor based on the calculated discharge capacity and the detected second physical value; and control means for controlling a parameter of said engine based on the calculated torque.

17. An apparatus as claimed in claim 16, wherein said third detecting means comprises a first sensor for detecting a temperature of outside air, a second sensor for detecting a temperature of the refrigerant of the heat exchanger and a third sensor for detecting a physical amount indicative of an amount of air supplied to the heat exchanger.

18. An apparatus for calculating torque for a variable capacity type compressor provided in a refrigeration circuit equipped in an automotive vehicle that has an engine, to compress and discharge refrigerant to be circulated through a condenser and an evaporator in the refrigeration circuit, the apparatus comprising:

ambient temperature detecting means for detecting a temperature of air coming into an inside of the vehicle from outside;

refrigerant pressure detecting means for detecting a pressure of the refrigerant circulated in a high-pressure side of the refrigeration circuit;

vehicle speed detecting means for detecting a speed of the vehicle;

torque calculation means for calculating torque for the compressor in accordance with said detected ambient temperature of the air, said detected pressure of the refrigerant and said detected speed of the vehicle; and means for controlling a parameter of said engine based on the calculated torque.

* * * * *